(12) United States Patent
Ishida et al.

(10) Patent No.: US 11,154,932 B2
(45) Date of Patent: Oct. 26, 2021

(54) MANUFACTURING METHOD FOR THREE-DIMENSIONAL STRUCTURE, MANUFACTURING APPARATUS FOR THREE-DIMENSIONAL STRUCTURE, AND CONTROL PROGRAM FOR MANUFACTURING APPARATUS

(71) Applicant: SEIKO EPSON CORPORATION, Tokyo (JP)

(72) Inventors: Masaya Ishida, Hara (JP); Toshimitsu Hirai, Hokuto (JP); Eiji Okamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 359 days.

(21) Appl. No.: 15/335,245

(22) Filed: Oct. 26, 2016

(65) Prior Publication Data

US 2017/0120331 A1 May 4, 2017

(30) Foreign Application Priority Data

Oct. 29, 2015 (JP) .............................. JP2015-212632

(51) Int. Cl.
*B22F 10/20* (2021.01)
*B22F 7/02* (2006.01)
(Continued)

(52) U.S. Cl.
CPC .............. *B22F 10/20* (2021.01); *B22F 7/008* (2013.01); *B22F 7/02* (2013.01); *B22F 7/06* (2013.01); *B28B 1/001* (2013.01); *B29C 64/153* (2017.08); *B33Y 10/00* (2014.12); *C04B 35/62222* (2013.01); *B22F 10/30* (2021.01); *B22F 2301/35* (2013.01); *B22F 2302/253* (2013.01);
(Continued)

(58) Field of Classification Search
CPC ..... B29C 64/153; B23K 15/086; B28B 1/001; B22F 2003/1057
See application file for complete search history.

(56) References Cited

U.S. PATENT DOCUMENTS

| 5,387,380 A | 2/1995 | Cima et al. |
| 5,848,351 A | 12/1998 | Hoshino et al. |

(Continued)

FOREIGN PATENT DOCUMENTS

| CN | 102643096 A | 8/2012 |
| CN | 1158774 | 10/2015 |

(Continued)

OTHER PUBLICATIONS

European Search Report for Application No. 16196234.5 dated Mar. 23, 2017.

*Primary Examiner* — Nicholas A Wang
(74) *Attorney, Agent, or Firm* — Workman Nydegger

(57) ABSTRACT

A manufacturing method for a three-dimensional structure includes forming unit layers using at least one of a first flowable composition including first powder and a second flowable composition including second powder and solidifying at least one of the first flowable composition including the first powder and the second flowable composition including the second powder in the unit layers. In the forming the unit layers, both of the first flowable composition and the second flowable composition are caused to be present in plane directions crossing a thickness direction of the unit layers.

16 Claims, 12 Drawing Sheets

(51) Int. Cl.

| | | |
|---|---|---|
| B22F 7/06 | (2006.01) | |
| C04B 35/622 | (2006.01) | |
| B29C 64/153 | (2017.01) | |
| B33Y 10/00 | (2015.01) | |
| B22F 7/00 | (2006.01) | |
| B28B 1/00 | (2006.01) | |
| *C22C 29/12* | (2006.01) | |
| *C22C 29/06* | (2006.01) | |
| *C22C 26/00* | (2006.01) | |
| *C22C 29/16* | (2006.01) | |
| *B33Y 40/00* | (2020.01) | |
| *B29C 64/209* | (2017.01) | |
| *B29C 64/336* | (2017.01) | |
| *B22F 10/30* | (2021.01) | |
| *B33Y 30/00* | (2015.01) | |
| *B33Y 50/02* | (2015.01) | |
| *B29K 105/00* | (2006.01) | |
| *B29L 9/00* | (2006.01) | |

(52) U.S. Cl.
CPC ..... *B22F 2302/406* (2013.01); *B22F 2998/10* (2013.01); *B22F 2999/00* (2013.01); *B29C 64/209* (2017.08); *B29C 64/336* (2017.08); *B29K 2105/251* (2013.01); *B29L 2009/00* (2013.01); *B33Y 30/00* (2014.12); *B33Y 40/00* (2014.12); *B33Y 50/02* (2014.12); *C04B 2235/6026* (2013.01); *C04B 2235/665* (2013.01); *C22C 26/00* (2013.01); *C22C 29/06* (2013.01); *C22C 29/12* (2013.01); *C22C 29/16* (2013.01); *Y02P 10/25* (2015.11)

(56) References Cited

U.S. PATENT DOCUMENTS

| | | |
|---|---|---|
| 6,117,592 A | 9/2000 | Hoshino et al. |
| 6,363,606 B1 | 4/2002 | Johnson, Jr. et al. |
| 2003/0206820 A1* | 11/2003 | Keicher ............... B23K 26/34 419/9 |
| 2011/0123383 A1 | 5/2011 | Fuwa et al. |
| 2011/0305590 A1* | 12/2011 | Wescott ............... B29C 64/153 419/6 |
| 2012/0145683 A1* | 6/2012 | Miyagi ............... B23K 35/383 219/121.64 |
| 2012/0237745 A1* | 9/2012 | Dierkes ............... B23K 26/08 428/215 |
| 2014/0099476 A1 | 4/2014 | Subramanian et al. |
| 2014/0183792 A1 | 7/2014 | Leu et al. |
| 2015/0044084 A1* | 2/2015 | Hofmann ............... C22C 38/08 419/7 |
| 2015/0104346 A1 | 4/2015 | Nakamura et al. |
| 2015/0165556 A1* | 6/2015 | Jones ............... B23K 26/0626 264/482 |
| 2015/0258706 A1 | 9/2015 | Okamoto et al. |
| 2015/0266240 A1 | 9/2015 | Okamoto et al. |
| 2016/0158889 A1* | 6/2016 | Carter ............... B22F 5/009 219/76.12 |
| 2016/0271732 A1* | 9/2016 | Dutta ............... H05B 6/06 |
| 2016/0332253 A1* | 11/2016 | Nardi ............... C04B 35/62823 |
| 2017/0050198 A1* | 2/2017 | Ohno ............... B23K 26/144 |
| 2017/0050268 A1* | 2/2017 | Fujiya ............... B29C 64/153 |
| 2017/0087666 A1* | 3/2017 | Sasaki ............... B22F 3/105 |
| 2017/0182556 A1* | 6/2017 | Ramaswamy ......... B33Y 10/00 |
| 2017/0282297 A1* | 10/2017 | Ohno ............... B29C 67/00 |

FOREIGN PATENT DOCUMENTS

| | | |
|---|---|---|
| DE | 102007029052 A1 | 1/2009 |
| EP | 2502729 A1 | 9/2012 |
| JP | 06-218712 | 8/1994 |
| JP | 2008-081840 | 4/2008 |
| JP | 2015-081380 | 4/2015 |
| JP | 2015-096646 | 5/2015 |
| JP | 2015-174425 | 10/2015 |
| WO | 2015141779 A | 9/2015 |

* cited by examiner

MANUFACTURING METHOD FOR THREE-DIMENSIONAL STRUCTURE, MANUFACTURING APPARATUS FOR THREE-DIMENSIONAL STRUCTURE, AND CONTROL PROGRAM FOR MANUFACTURING APPARATUS

BACKGROUND

1. Technical Field

The present invention relates to a manufacturing method for a three-dimensional structure, a manufacturing apparatus for a three-dimensional structure, and a control program for the manufacturing apparatus for the three-dimensional structure.

2. Related Art

An example of a manufacturing apparatus for a three-dimensional structure is disclosed in JP-A-2008-81840 (Patent Literature 1).

Patent Literature 1 mentions that layers are formed using one kind of metal powder or a plurality of kinds of mixed powder as materials and stacked to mold a three-dimensional molded object.

The manufacturing apparatus for a three-dimensional molded object in the past described in Patent Literature 1 forms layers using one kind of metal powder or a plurality of kinds of mixed metal powder as materials and stacking the layers to mold a three-dimensional molded object. Therefore, characteristics (mechanical characteristics, thermal characteristics, electric characteristics, and the like) of sections of the molded object are uniform.

Therefore, a three-dimensional structure having characteristics (mechanical characteristics, thermal characteristics, electric characteristics, and the like) requested according to parts of the three-dimensional structure cannot be manufactured.

SUMMARY

An advantage of some aspects of the invention is to make it possible to easily provide a three-dimensional structure having characteristics (mechanical characteristics, thermal characteristics, electric characteristics, and the like) requested according to parts of the three-dimensional structure.

A first aspect of the invention is directed to a manufacturing method for a three-dimensional structure including: forming unit layers using at least one of a first flowable composition including first powder and a second flowable composition including second powder; and solidifying at least one of the first powder and the second powder in the unit layers. In the forming the unit layers, both of the first flowable composition and the second flowable composition are caused to be present in a plane direction crossing a thickness direction of the unit layers.

The "powder" may be anyone of metal powder, ceramics powder, resin powder, and the like and may be a mixture of two or more kinds of the metal powder, the ceramics powder, the resin powder, and the like.

The "three-dimensional structure" is not limited to a cubic structure in which a plurality of unit layers having predetermined thickness are stacked in a stacking direction and includes a planar structure in which only one unit layer having predetermined thickness is provided.

According to this aspect, in manufacturing the three-dimensional structure, in the forming the unit layers, the unit layers are formed by causing both of the first flowable composition and the second flowable composition to be present in the plane direction crossing the thickness direction of the unit layers. Consequently, by changing presence ratios of the first flowable composition and the second flowable composition, it is possible to change presence ratios of first particles and second particles in parts of the three-dimensional structure. Therefore, it is possible to easily obtain a three-dimensional structure having characteristics (mechanical characteristics, thermal characteristics, electric characteristics, and the like) requested according to parts of the three-dimensional structure.

The "characteristics" include physical characteristics and chemical characteristics. Specifically, examples of the characteristics include heat resistance, high heat dissipation, high strength, high rigidity, high toughness, high hardness, high durability, pressure resistance, high electric conductivity, abortion resistance, chemical resistance, and corrosion resistance.

Examples of specific factors for determining the mechanical characteristics include hardness, tensile strength, yield strength, elongation, flexural strength, torsional strength, shearing strength, a Young's modulus, a Poisson's ratio, and compression strength. Examples of specific factors for determining the thermal characteristic include a melting point, a coefficient of linear expansion, thermal conductivity, specific heat, and thermal shock resistance. Examples of specific factors for determining the electric characteristics include electric conductivity, volume resistivity, a dielectric constant, and dielectric strength. Besides, examples of specific factors for determining magnetic characteristics include magnetic permeability and magnetic susceptibility.

A second aspect of the invention is directed to the manufacturing method for the three-dimensional structure according to the first aspect, in which the manufacturing method further includes repeating the forming the unit layers in a stacking direction.

According to this aspect, by performing the repeating the forming the unit layers in the stacking direction, it is possible to change the presence ratios of the first flowable composition and the second flowable composition in the stacking direction as well. It is possible to easily obtain the three-dimensional structure having the characteristics requested according to the parts of the three-dimensional structure.

A third aspect of the invention is directed to the manufacturing method for the three-dimensional structure according to the first aspect or the second aspect, in which the forming the unit layers is performed by setting presence ratios and presence positions the first powder and the second powder in the unit layers for each of parts (layers) in a stacking direction of the three-dimensional structure.

The "setting presence ratios and presence positions of the first powder and the second powder in the unit layers" also means that the forming the unit layers is performed by setting presence ratios and presence positions of the first flowable composition including the first powder and the second flowable composition including the second powder in the unit layers.

According to this aspect, it is possible to manufacture the three-dimensional structure by efficiently exhibiting the characteristics requested according to the parts (the layers) of the three-dimensional structure.

A fourth aspect of the invention is directed to the manufacturing method for the three-dimensional structure according to any one of the first to third aspects, in which the first flowable composition including the first powder and the second flowable composition including the second powder are caused to be present to at least partially overlap when viewed from a stacking direction between the unit layers adjacent to each other.

According to this aspect, the first flowable composition including the first powder and the second flowable composition including the second powder are present to at least partially overlap when viewed from the stacking direction between the unit layers adjacent to each other. Therefore, continuity in the stacking direction of changes in characteristics imparted to the part is improved.

A fifth aspect of the invention is directed to the manufacturing method for the three-dimensional structure according to any one of the first to fourth aspects, in which, in the forming the unit layers, the unit layers are formed by discharging, with a discharging unit, at least one of the first flowable composition and the second flowable composition.

According to this aspect, at least one of the first flowable composition and the second flowable composition in a paste state is discharged to a layer forming region to form the unit layers. Therefore, it is possible to adjust, with the discharging unit, a discharge amount, a discharging position, discharging timing, and the like of the flowable composition. Therefore, it is possible to easily change the presence ratios of the first flowable composition and the second flowable composition. Characteristics requested to the three-dimensional structure are easily obtained.

A sixth aspect of the invention is directed to the manufacturing method for the three-dimensional structure according to any one of the first to fifth aspects, in which, in the forming the unit layers, the unit layers are formed by pluralities of sub-layers in at least parts of the unit layers in a direction along the unit layers, and the sub-layers are formed of flowable compositions including different kinds of powder.

According to this aspect, by forming the sub-layers from the flowable compositions including the different kinds of powder, it is possible to adapt the three-dimensional structure to characteristics more finely requested to the unit layers.

A seventh aspect of the invention is directed to the manufacturing method for the three-dimensional structure according to any one of the first to sixth aspects, in which one end side in a stacking direction forms a first layer from the first flowable composition including the first powder, the other end side in the stacking direction forms a second layer from the second flowable composition including the second powder, and, between the first layer and the second layer, a composite material layer including the first flowable composition including the first powder and the second flowable composition including the second powder is formed.

According to this aspect, between the first layer formed of the first flowable composition including the first powder on the one end side in the stacking direction and the second layer formed of the second flowable composition including the second powder on the other end side in the stacking direction, the composite material layer including the two flowable compositions individually including both the kinds of powder is formed. Therefore, it is possible to adjust the inside of the three-dimensional structure to appropriate characteristics in the stacking direction by adjusting compositions (including presence ratios and presence positions) of the flowable compositions forming the composite material layer.

An eighth aspect of the invention is directed to the manufacturing method for the three-dimensional structure according to the seventh aspect, in which, in the composite material layer, the presence ratio of the first flowable composition including the first powder gradually decreases and the presence ratio of the second flowable composition including the second powder gradually increases in a direction from the first layer to the second layer.

According to this aspect, it is possible to continuously change the characteristics imparted to the three-dimensional structure from the one side to the other side in the stacking direction. It is possible to reasonably and smoothly shift the characteristics from characteristics of the first layer to characteristics of the second layer. Therefore, it is possible to reduce likelihood of occurrence of peeling and cracks between the layers and between the sub-layers in the stacking direction.

A ninth aspect of the invention is directed to the manufacturing method for the three-dimensional structure according to any one of the first to eighth aspects, in which one side end side in the plane direction forms a first side end layer from the first flowable composition including the first powder, the other side end side in the plane direction forms a second side end layer from the second flowable composition including the second powder, and, between the first side end layer and the second side end layer, a composite material layer including the first flowable composition including the first powder and the second flowable composition including the second powder is formed.

According to this aspect, between the layer of the first powder on the one side end side in the plane direction crossing the stacking direction and the layer of the second powder on the other side end side in the plane direction, the composite material layer including both the kinds of powder is formed. Therefore, it is possible to adjust the inside of the three-dimensional structure to appropriate characteristics in the stacking direction by adjusting compositions (including presence ratios and presence positions) of the flowable compositions forming the composite material layer.

A tenth aspect of the invention is directed to the manufacturing method for the three-dimensional structure according to the ninth aspect, in which, in the composite material layer, the presence ratio of the first flowable composition including the first powder gradually decreases and the presence ratio of the second flowable composition including the second powder gradually increases in a direction from the first side end layer to the second side end layer.

According to this aspect, it is possible to continuously change the characteristics imparted to the three-dimensional structure from the one side to the other side in the plane direction. It is possible to reasonably and smoothly shift the characteristics from characteristics of the first side end layer to characteristics of the second side end layer. Therefore, it is possible to reduce likelihood of occurrence of peeling and cracks between the layers and between the flowable compositions in the plane direction.

An eleventh aspect of the invention is directed to the manufacturing method for the three-dimensional structure according to any one of the first to tenth aspects, in which, in the forming the unit layers, a void is formed in a part in the unit layers.

The "void" means a blank region where the flowable compositions are absent.

According to this aspect, it is possible to easily provide a through-hole, a recessed section, a hollow, and the like on the basis of a part (a layer) of the three-dimensional structure. This can contribute to a reduction in the weight and saving of the materials of the three-dimensional structure.

A twelfth aspect of the invention is directed to the manufacturing method for the three-dimensional structure according to anyone of the first to eleventh aspects, in which at least one of the first powder included in the first flowable composition and the second powder included in the second flowable composition is mixed powder including a plurality of kinds of powder.

According to this aspect, at least one of the first powder and the second powder is the mixed powder. Therefore, it is possible to easily provide various characteristics in the three-dimensional structure according to adjustment of compositions including a mixing ratio of the mixed powder.

A thirteenth aspect of the invention is directed to the manufacturing method for the three-dimensional structure according to the twelfth aspect, in which the first powder and the second powder include at least one kind of same powder.

The "including at least one kind of same powder" means, as a specific example, a combination in which a powder A is included in both of the first powder and the second powder, for example, the first powder is the powder A and the second powder is mixed powder of the powder A and powder C or the first powder is mixed powder of the powder A and powder B and the second powder is mixed powder of the powder A and the powder C.

According to this aspect, the first powder and the second powder include the same component. Therefore, it is possible to moderate a change in the characteristics between the flowable compositions of the different kinds. It is possible to reduce likelihood of occurrence of peeling and cracks between the flowable compositions and between the unit layers.

A fourteenth aspect of the invention is directed to the manufacturing method for the three-dimensional structure according to any one of the first to thirteenth aspects, in which the solidifying the powder is performed for each of the unit layers.

According to this aspect, the solidifying the powder is performed for each of the unit layers. Therefore, it is possible to equalize a change in the characteristics in the unit layer.

A fifteenth aspect of the invention is directed to the manufacturing method for the three-dimensional structure according to any one of the first to thirteenth aspects, in which the solidifying the powder is performed for each plurality of unit layers in which co-presence states of the first flowable composition and the second flowable composition are the same.

According to this aspect, the solidifying the powder is performed for each plurality of unit layers in which the co-presence states of the first flowable composition and the second flowable composition are the same. That is, the solidifying the powder is performed for each plurality of unit layers in which a co-presence states of both the kinds of powder are the same. Therefore, it is possible to equalize a change in the characteristics in a plurality of unit layer portions in which the co-presence states are the same. It is possible to efficiently execute the solidification of the flowable compositions.

A sixteenth aspect of the invention is directed to the manufacturing method for the three-dimensional structure according to any one of the first to thirteenth aspects, in which the solidifying the powder is performed for each plurality of unit layers including at least both the unit layers adjacent to each other including interfaces in which co-presence states of the first flowable composition and the second flowable composition are different.

According to this aspect, the solidifying the powder is performed for each plurality of unit layers including both the unit layers sandwiching the interfaces in which the presence ratios are different. Therefore, it is possible to moderate a sudden change in the characteristics on the interfaces.

A seventeenth aspect of the invention is directed to the manufacturing method for the three-dimensional structure according to any one of the first to thirteenth aspects, in which the solidifying the powder is performed after the forming the unit layers is completed.

According to this aspect, the solidifying the powder is performed after the forming the unit layers is completed. Therefore, it is possible to moderate a change in the characteristics of the three-dimensional structure as a whole. The manufacturing method is particularly suitable when the powder is solidified by sintering.

An eighteenth aspect of the invention is directed to the manufacturing method for the three-dimensional structure according to any one of the first to seventeenth aspects, in which the solidifying the powder is performed by radiating a laser beam.

According to this aspect, it is possible to easily perform the solidifying the powder using the laser beam.

A nineteenth aspect of the invention is directed to a manufacturing apparatus for a three-dimensional structure including: a plurality of discharging sections configured to discharge respective flowable compositions including different kinds of powder; a driving section configured to move the plurality of discharging sections in three-dimensional directions relatively to a discharge region; and a control section configured to control the discharging sections and the driving section. The control section controls the plurality of discharging sections and the driving sections to change presence ratios of the flowable compositions for each piece of the three-dimensional structure.

According to this aspect, it is possible to obtain action and effects same as the action and effects in the first aspect. It is possible to efficiently manufacture the three-dimensional structure having characteristics requested according to parts of the three-dimensional structure.

A twentieth aspect of the invention is directed to a control program for a manufacturing apparatus for a three-dimensional structure, the control program causing a computer to execute a plurality of discharging functions for discharging respective flowable compositions including different kinds of powder and disposing the flowable compositions side by side with presence ratios and presence positions of the flowable compositions changed.

According to this aspect, it is possible to obtain action and effects same as the action and effects in the first aspect. It is possible to control operations of sections of the manufacturing apparatus for the three-dimensional structure such that the three-dimensional structure can include characteristics requested according to parts of the three-dimensional structure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Manufacturing methods for a three-dimensional structure, manufacturing apparatuses for the three-dimensional structure, and control programs for the manufacturing apparatuses according to embodiments of the invention are explained in detail below with reference to the accompanying drawings.

Note that, in the following explanation, first, the overall configuration of a manufacturing apparatus for a three-dimensional structure according to the invention is schematically explained with reference to a manufacturing apparatus for a three-dimensional structure according to a first embodiment as an example. Then, the specific configuration of a main part serving as a characteristic configuration of the invention of the manufacturing apparatus for the three-dimensional structure according to the first embodiment and contents of a control program for the manufacturing apparatus for the three-dimensional structure are explained.

Subsequently, a manufacturing method for a three-dimensional structure according to the invention executed by using the manufacturing apparatus for the three-dimensional structure according to the first embodiment is specifically explained with reference to second to tenth embodiments as examples.

Further, differences from the first embodiment of the configuration of manufacturing apparatuses for a three-dimensional structure according to eleventh and twelfth embodiments partially varied from the first embodiment and a flow of manufacturing by the manufacturing apparatuses are mainly explained in order. Subsequently, concerning three forms in which compositions of flowable compositions are varied, differences between two kinds of stacking models of three-dimensional structures manufactured by manufacturing methods for a three-dimensional structure according to the second to tenth embodiments are explained using the two kinds of stacking models.

Further, differences from the first embodiment of the configuration of a manufacturing apparatus for a three-dimensional structure according to a thirteenth embodiment partially varied from the first embodiment and a flow of manufacturing of the three-dimensional structure are mainly specifically explained. Finally, manufacturing methods for a three-dimensional structure, manufacturing apparatuses for the three-dimensional structure, and control programs for the manufacturing apparatuses according to other embodiments of the invention partially varied from the embodiments are explained.

Figure 1:
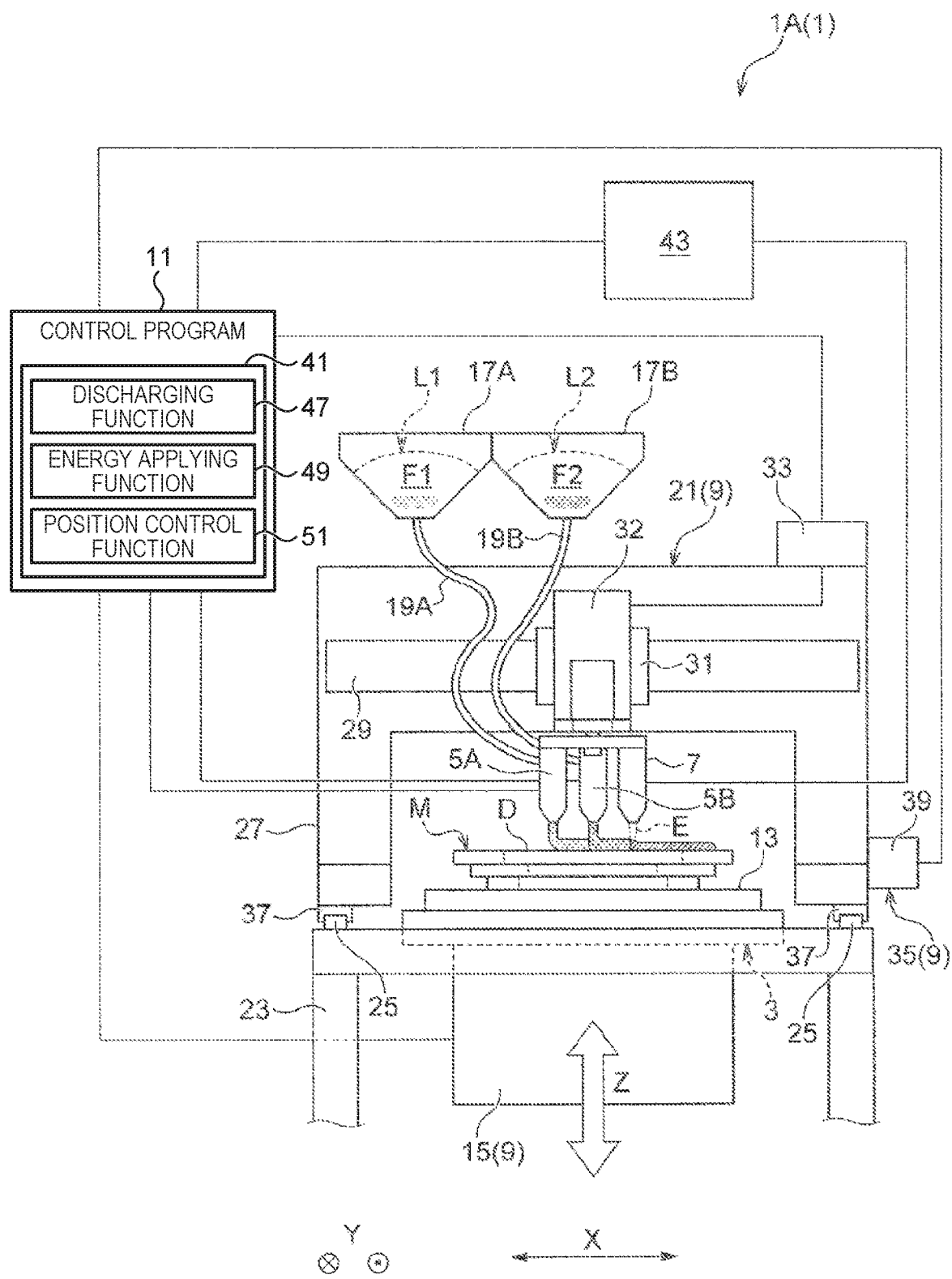
FIG. 1 is a front view schematically showing the overall configuration of a manufacturing apparatus for a three-dimensional structure according to a first embodiment of the invention.
Figure 2:
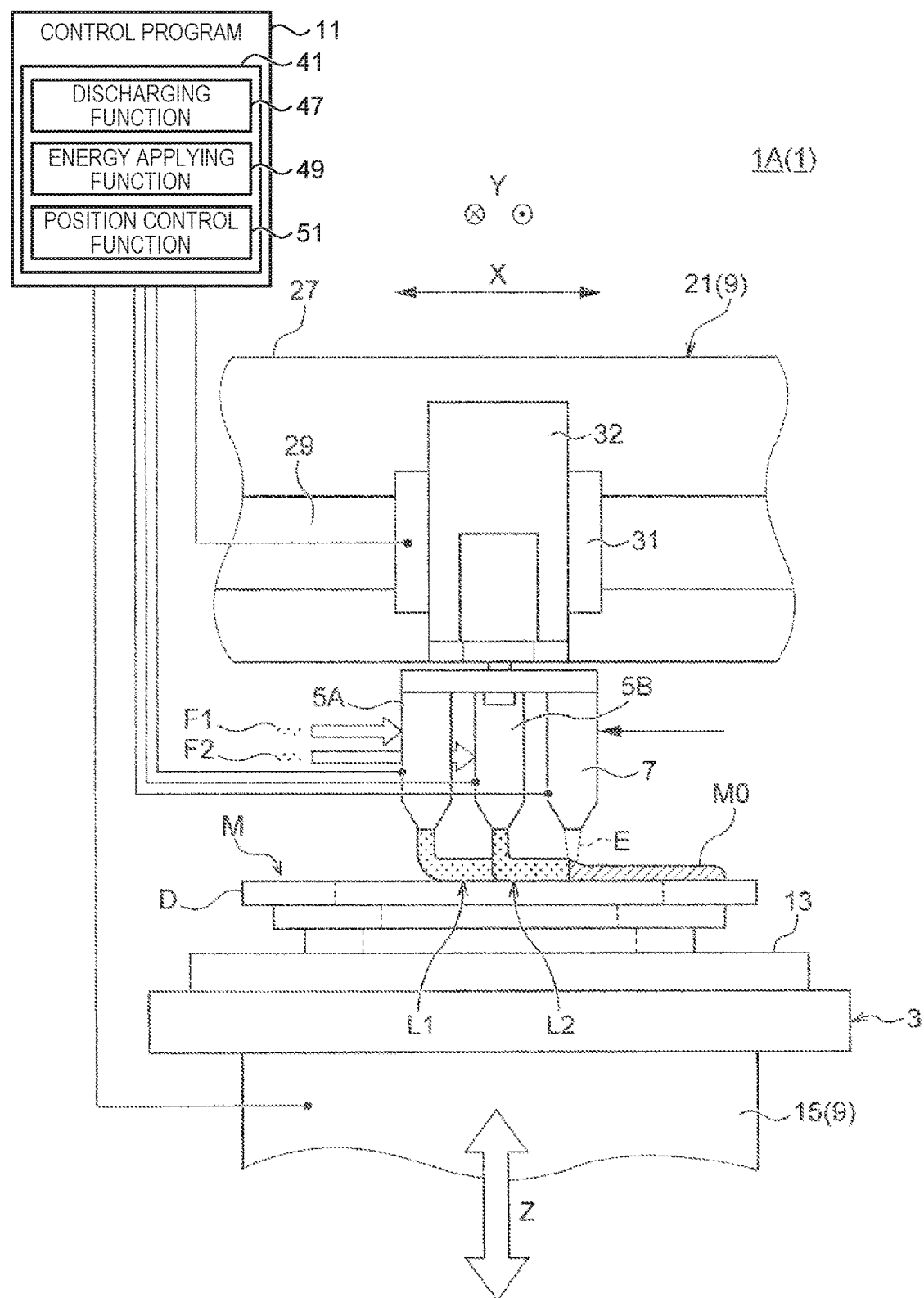
FIG. 2 is a front view showing a main part of the manufacturing apparatus for the three-dimensional structure according to the first embodiment of the invention.
Figure 3:
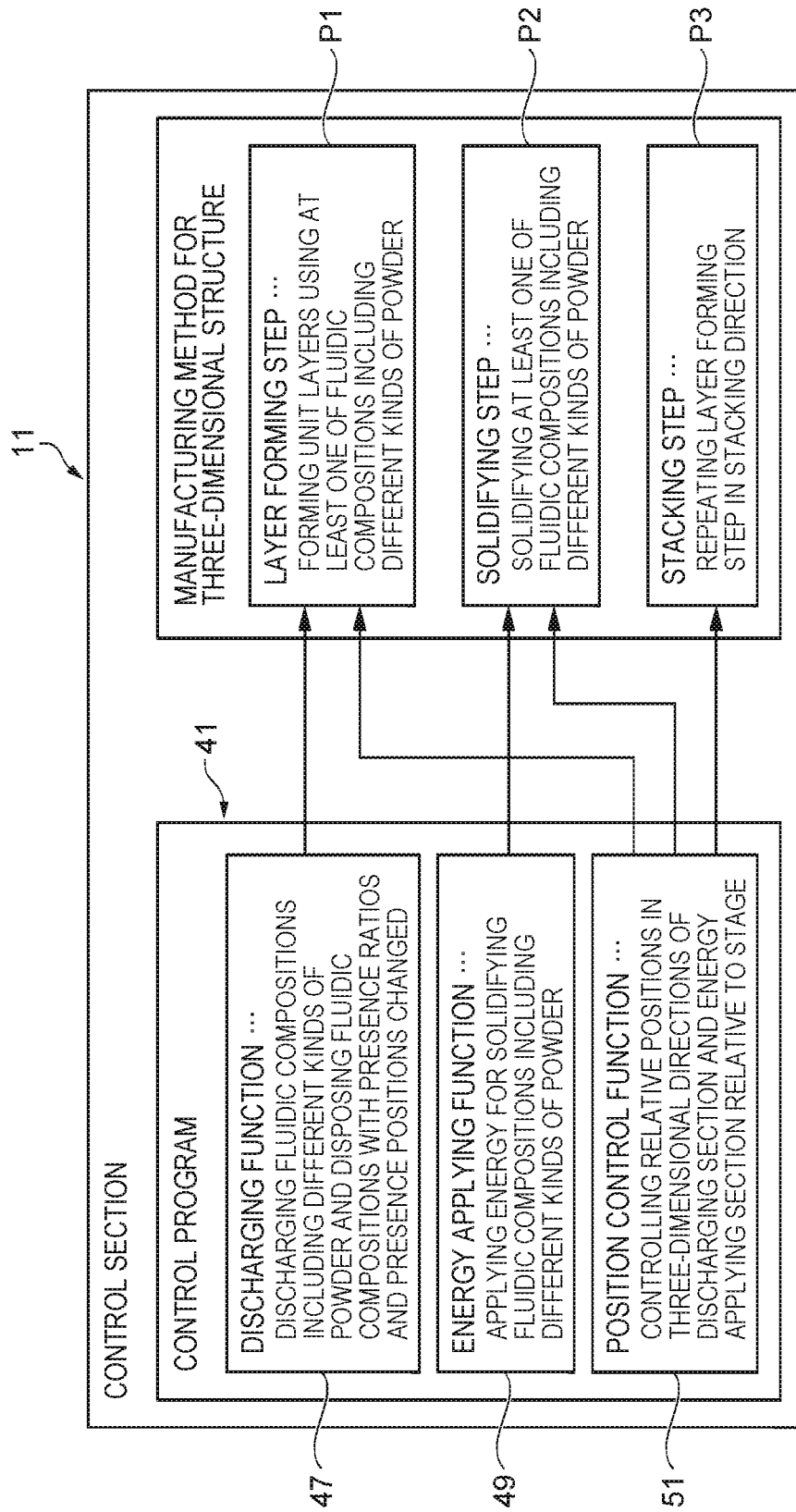
FIG. 3 is a block diagram showing a relation between contents of a control program for the manufacturing apparatus for the three-dimensional structure according to the first embodiment of the invention and steps of a manufacturing method for a three-dimensional structure according to the invention.

First Embodiment (See FIGS. 1 to 3)

(1) Overview of the Overall Configuration of a Manufacturing Apparatus for a Three-Dimensional Structure (See FIG. 1)

As shown in the figure, a manufacturing apparatus 1A for a three-dimensional structure according to this embodiment is an apparatus that radiates a laser beam E, which is an example of an energy beam, on flowable compositions L1 and L2 discharged onto a stage 3 and solidifies the flowable compositions L1 and L2 to thereby form one unit layer D and thereafter repeats the same operation a predetermined number of times in a stacking direction Z to thereby manufacture a three-dimensional structure M.

Specifically, the manufacturing apparatus 1 for the three-dimensional structure according to this embodiment is basically configured by including the stage 3 onto which the respective flowable compositions L1 and L2 including different kinds of powder F1 and F2 are discharged, discharge heads 5A and 5B, which are a plurality of discharging sections that discharge the respective flowable compositions L1 and L2 including the kinds of powder F1 and F2, a radiating section 7, which is an energy applying section that applies energy for solidifying the discharged kinds of powder F1 and F2 present on a discharge region 13, a driving section 9 that moves the stage 3, the discharge heads 5, and the radiating section 7 in three-dimensional directions X, Y, and Z relatively to the discharge region 13 serving as a layer forming region, and a control section 11 that controls the discharge heads 5, the driving section 9, and the radiating section 7.

When the three-dimensional structure M is manufactured, a characteristic configuration of this embodiment is to change presence ratios and presence positions of the respective flowable compositions L1 and L2 on the basis of parts of the three-dimensional structure M using the plurality of discharge heads 5A and 5B.

The stage 3 is, for example, a flat member including the discharge region 13 onto which the flowable compositions L are discharged. The stage 3 is configured to be movable by a predetermined stroke necessary for formation of the three-dimensional structure M in the stacking direction Z by a lifting/lowering driving device 15, which is a constituent member of the driving section 9.

The discharge heads 5 are members including nozzles for discharging the flowable compositions L, which are supplied from material supply units 17A and 17B via supply tubes 19A and 19B, toward the discharge region 13. The discharge heads 5 are configured to be movable by the predetermined stroke necessary for the formation of the three-dimensional structure M in a first direction X, which is, for example, a width direction, by a first driving device 21, which is a constituent member of the driving section 9. In this embodiment, two sets of the heads 5A and 5B, the material supply units 17A and 17B, and the supply tubes 19A and 19B corresponding to the respective flowable compositions L1 and L2 including the different kinds of powder F1 and F2 are provided.

The radiating section 7 is a device that radiates the laser beam E toward the flowable compositions L1 and L2 discharged onto the discharge region 13 as explained above. Like the discharge heads 5, the radiating section 7 are configured to be movable by the predetermined stroke in the first direction X by the first driving device 21.

Note that, in the embodiment shown in the figure, as the first driving device 21, a driving device including a traveling frame 27 that travels on two second guide rails 25 disposed on a supporting frame 23 and extending in a second direction Y, which is the front-back direction, a first guide rail 29 provided to extend in the first direction X with respect to the traveling frame 27, a first slide block 31 that reciprocatingly moves in the first direction X along the first guide rail 29, and a first actuator 33 that applies a driving force to the first slide block 31 is applied as an example. The discharge heads 5 and the radiating section 7 are attached to, for example, a reversible carriage 32 integrally including the first slide block 31.

The traveling frame 27 is configured to be movable by the predetermined stroke necessary for the formation of the three-dimensional structure M in, for example, the second direction Y, which is the front-back direction, by a second driving device 35, which is a constituent member of the driving section 9.

Note that, in the embodiment shown in the figure, as the second driving device 35, a driving device including two second guide rails 25 disposed on the supporting frame 23, a second slide block 37 provided with respect to the traveling frame 27 that reciprocatingly moves in the second direction Y along the second guide rails 25, and a second actuator 39 that applies a driving force to the second slide block 37 is applied as an example.

(2) Specific Configuration of a Main Part of the Manufacturing Apparatus for the Three-Dimensional Structure (See FIG. 2)

In the manufacturing apparatus 1A for the three-dimensional structure according to this embodiment, as the flowable compositions L1 and L2 including the kinds of powder F1 and F2 serving as materials, a composition of powder of metal or the like, a binder, and a solvent or a dispersion medium can be applied as an example.

The powder may be any one of various kinds of metal powder, ceramic powder, resin powder, and the like or may be a mixture of two or more kinds of the metal powder, the ceramics powder, the resin powder, and the like.

Specifically, it is possible to use powder of various kinds of metal such as aluminum, titanium, iron, copper, magnesium, stainless steel, and maraging steel, various metal oxides such as silica, alumina, titanium oxide, zinc oxide, zirconium oxide, tin oxide, magnesium oxide, and potassium titanate, various metal hydroxides such as magnesium hydroxide, aluminum hydroxide, and calcium hydroxide, various metal nitrides such as silicon nitride, titanium nitride, and aluminum nitride, various metal carbides such as silicon carbide and titanium carbide, various metal sulfides such as zinc sulfide, various metal carbonates such as calcium carbonate and magnesium carbonate, various metal sulfates such as calcium sulfate and magnesium sulfate, various metal silicate such as calcium silicate and magnesium silicate, various metal phosphates such as calcium phosphate, various metal borates such as aluminum borate and magnesium borate, conjugated compounds of the forgoing, gypsum (hydrates of calcium sulfate and anhydrides of calcium sulfate), and the like.

Examples of the solvent or the dispersion medium include, beside various kinds of water such as distilled water, pure water, and RO water, alcohols such as methanol, ethanol, 2-propanol, 1-butanol, 2-butanol, octanol, ethylene glycol, diethylene glycol, and glycerin, ethers (cellosolves) such as ethyleneglycol monomethyl ether (methylcellosolve), esters such as methyl acetate, ethyl acetate, butyl acetate, and ethyl formate, ketones such as acetone, methyl ethyl ketone, diethyl kenone, methyl isobutyl kenone, methyl isopropyl ketone, and cyclohexanone, aliphatic hydrocarbons such as pentane, hexane, and oxtane, cyclic hydrocarbons such as cyclohexane and methyl cyclohexane, aromatic hydrocarbons having a long chain alkyl group and a benzene ring such as benzene, toluene, xylene, hexyl benzene, butyl benzene, octyl benzene, nonyl benzene, decyl benzene, undecyl benzene, dodecyl benzene, tridecyl benzene, and tetradecyl benzene, halogenated hydrocarbons such as methylene chloride, chloroform, carbon tetrachloride, and 1,2-dichloroethane, aromatic heterocycles including any one of pyridine, pyrazine, furan, pyrrole, thiophene, and methyl pyrolidone, nitriles such as acetonitrile, propionitrile, and acrylonitrile, amides such as N,N-dimelylamide and N,N-dimethylacetamide, carboxylate, and other various oils.

The solvent or the dispersion medium is usually dried and removed before a heating and solidifying process by a laser or the like.

The binder is not limited as long as the binder is soluble in the solvent or the dispersion medium. For example, acrylic resin, epoxy resin, silicone resin, cellulose resin, and synthetic resin can be used. For example, thermoplastic resin such as PLA (polylactic acid), PA (polyamide), and PPS (polyphenylene sulfide) can also be used.

The binder may be dispersed in the solvent or the dispersion medium in a state of very small particles of resin such as the acrylic resin rather than a soluble state.

The binder is usually decomposed to disappear in the heating and solidifying process by the laser or the like.

As the radiating section 7, a laser radiating device can be applied as an example. A laser having a predetermined output is generated from a laser oscillator 43 on the basis of a control signal transmitted from the control section 11. The laser is radiated toward the discharge region 13 on the stage 3 from the radiating section 7 as the laser beam E, which is an energy beam.

Note that the laser used in this embodiment is not particularly limited. However, a fiber laser, a carbon dioxide laser, or the like can be used as a suitable laser because the laser has an advantage that absorption efficiency of metal is high.

(3) Contents of a Control Program for the Manufacturing Apparatus for the Three-Dimensional Structure (See FIG. 3)

A control program 41 for the manufacturing apparatus for the three-dimensional structure according to the invention is a control program for causing a computer to execute a plurality of discharging functions 47 for discharging the respective flowable compositions L1 and L2 including the different kinds of powder F1 and F2 and disposing the flowable compositions L1 and L2 side by side with presence ratios and presence positions of the flowable compositions L1 and L2 changed and an energy applying function 49 for applying energy for solidifying the kinds of powders F1 and F2.

Specifically, the control program 41 is executed in the control section 11 in the manufacturing apparatus 1A for the three-dimensional structure and includes a position control function 51 for controlling, for example, relative positions of the discharge heads 5 and the radiating section 7 relative to the stage 3 in addition to the discharging function 47 and the energy applying function 49.

As the discharging function 47, discharge amounts, discharge positions (including discharge directions), discharge timings, and the like of the respective flowable compositions L1 and L2 discharged from the plurality of discharge heads 5A and 5B are controlled. As the energy applying function 49, a radiation amount, a radiation position (including a radiation direction), radiation timing, and the like of the laser beam E are controlled.

As the position control function 51, relative positions in the three-dimensional directions X, Y, and Z of the plurality of discharge heads 5A and 5B, the radiating section 7, and the stage 3 are controlled. Consequently, it is possible to dispose the respective flowable compositions L1 and L2 including the different kinds of powder F1 and F2 at predetermined presence ratios and in predetermined presence positions in the unit layers D and dispose the unit layers D at predetermined presence ratios and in predetermined presence positions for each of parts (layers) in the stacking direction Z.

A manufacturing method for a three-dimensional structure according to the invention executed by using the manufacturing apparatus 1A for the three-dimensional structure and the control program 41 for the manufacturing apparatus 1A according to the first embodiment is specifically explained with reference to nine embodiments including second to tenth embodiments as examples.

Figure 4:
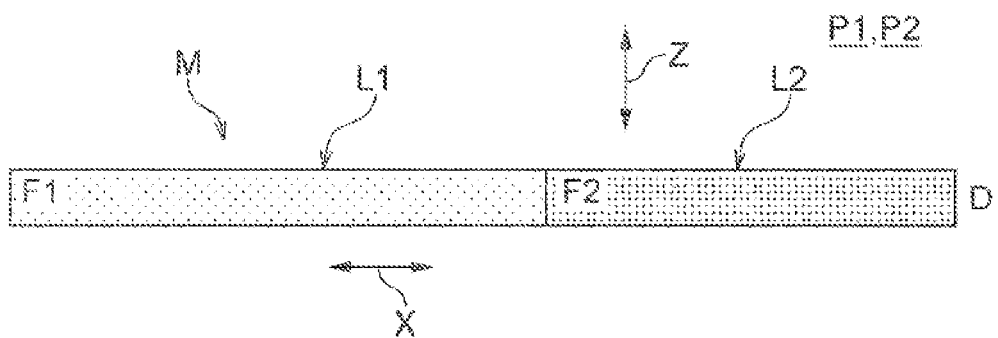
FIG. 4 is a longitudinal sectional front view schematically showing an example of a three-dimensional structure manufactured by a manufacturing method for a three-dimensional structure according to a second embodiment of the invention.
Figure 5:
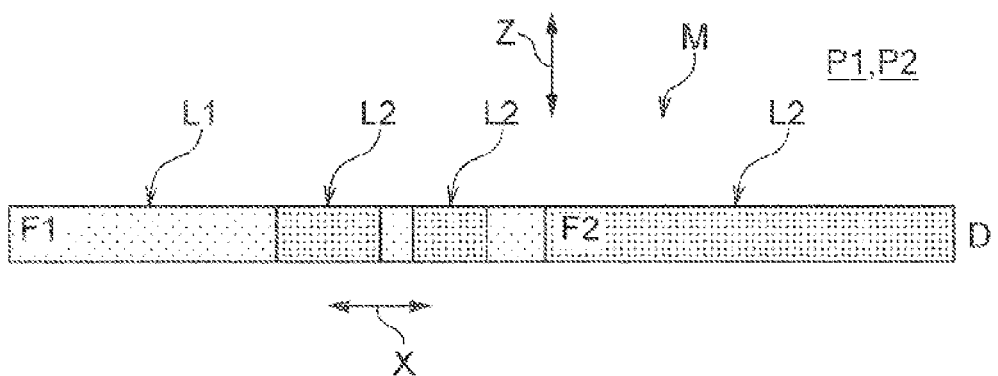
FIG. 5 is a longitudinal sectional front view schematically showing another example of the three-dimensional structure manufactured by the manufacturing method for the three-dimensional structure according to the second embodiment of the invention.

Second Embodiment (See FIGS. 4 and 5)

A manufacturing method for a three-dimensional structure according to the second embodiment basically includes a layer forming step P1 and a solidifying step P2 and has a characteristic in, in particular, content of the layer forming step P1. Contents of the layer forming step P1 and the solidifying step P2 are specifically explained below.

(1) Layer Forming Step

The layer forming step P1 is a step of forming the unit layers D using at least one of the first flowable composition L1 including the first powder F1 and the second flowable composition L2 including the second powder F2.

In this embodiment, the three-dimensional structure M configured by only one unit layer D formed by using both of the first flowable composition L1 and the second flowable composition L2 is shown. In the layer forming step P1, both of the first flowable composition L1 and the second flowable composition L2 are caused to be present in the plane direction (in the embodiment shown in the figure, the first direction X serving as the width direction) crossing a thickness direction Z (the sign is the same as the sign of the stacking direction Z) of the unit layer D.

(2) Solidifying Step

The solidifying step P2 is a step of solidifying at least one of the first powder F1 and the second powder F2 in the unit layer D.

In this embodiment, the three-dimensional structure M in a state in which both of the first powder F1 and the second powder F2 are solidified is shown. Incidentally, in FIG. 4, the three-dimensional structure M is shown in which powder A is disposed as the first powder F1 in a region on the left side of the unit layer D and powder B is disposed as the second powder F2 in a region on the right side of the unit layer D.

In FIG. 5, the three-dimensional structure M is shown in which a part of the first flowable composition L1 disposed in the region on the left side of FIG. 4 is not discharged to, for example, two portions as shown in the figure and the second flowable composition L2 is discharged to the portions to which the first flowable composition L1 is not discharged and thereafter the second flowable composition L2 is solidified.

With the manufacturing method for the three-dimensional structure according to this embodiment configured as explained above, by changing the presence ratios of the first flowable composition L1 and the second flowable composition L2, it is possible to easily obtain the three-dimensional structure M having characteristics (mechanical characteristics, thermal characteristics, electric characteristics, and the like) requested according to parts on the inside of the three-dimensional structure M.

Figure 6:
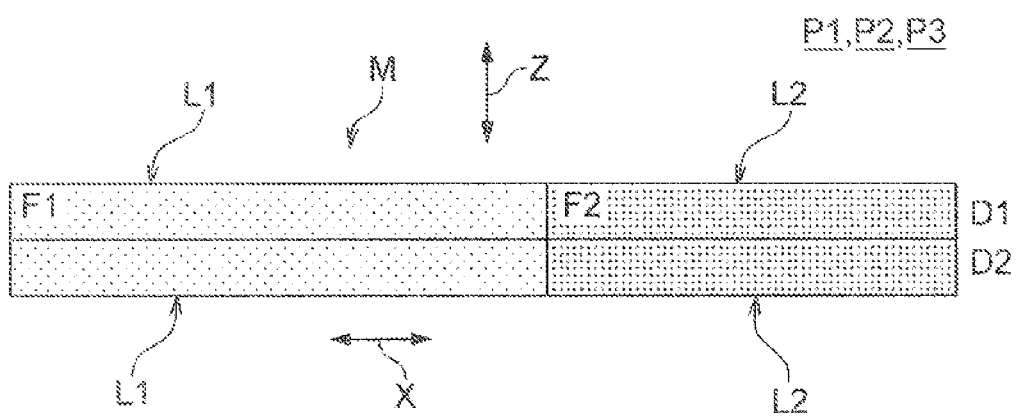
FIG. 6 is a longitudinal sectional front view schematically showing an example of a three-dimensional structure manufactured by a manufacturing method for a three-dimensional structure according to a third embodiment of the invention.
Figure 7:
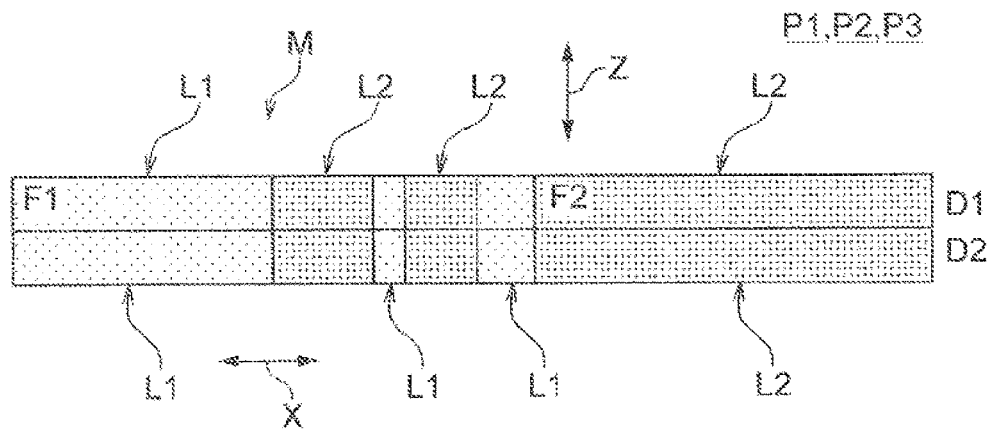
FIG. 7 is a longitudinal sectional front view schematically showing another example of the three-dimensional structure manufactured by the manufacturing method for the three-dimensional structure according to the third embodiment of the invention.

Third Embodiment (See FIGS. 6 and 7)

A manufacturing method for a three-dimensional structure according to the third embodiment includes a stacking step P3 in addition to the layer forming step P1 and the solidifying step P2. The layer forming step P1 and the solidifying step P2 are the same as the steps in the second embodiment. Therefore, detailed explanation of the layer forming step P1 and the solidifying step P2 is omitted. Only content of the stacking step P3 different from the content of the stacking step P3 in the second embodiment is explained.

That is, the stacking step P3 is a step of repeating the layer forming step P1 in the stacking direction Z. Specifically, the lifting/lowering driving device 15 is driven by the position control function 51 in the control program 41 to thereby lower the stage 3 by the thickness of the unit layer D to be formed and the layer forming step P1 is executed. Thereafter, the three-dimensional structure M having predetermined height is manufactured by repeating the downward movement of the stage 3 and the layer forming step P1 a predetermined number of times.

In FIG. 6, the three-dimensional structure M formed by stacking two layers of the unit layer D shown in FIG. 4 in the stacking direction Z is shown. In FIG. 7, the three-dimensional structure M formed by stacking two layers of the unit layer D shown in FIG. 5 in the stacking direction Z is shown.

Action and effects same as the action and effects in the second embodiment are exhibited by the manufacturing method for the three-dimensional structure according to this embodiment configured as explained above.

In this embodiment, the presence ratios and the presence positions of the first flowable composition L1 and the second flowable composition L2 can be changed in the stacking direction Z as well. It is possible to easily obtain the three-dimensional structure M having characteristics (physical characteristics and chemical characteristics) requested according to parts on the inside of the three-dimensional structure M.

Figure 8:
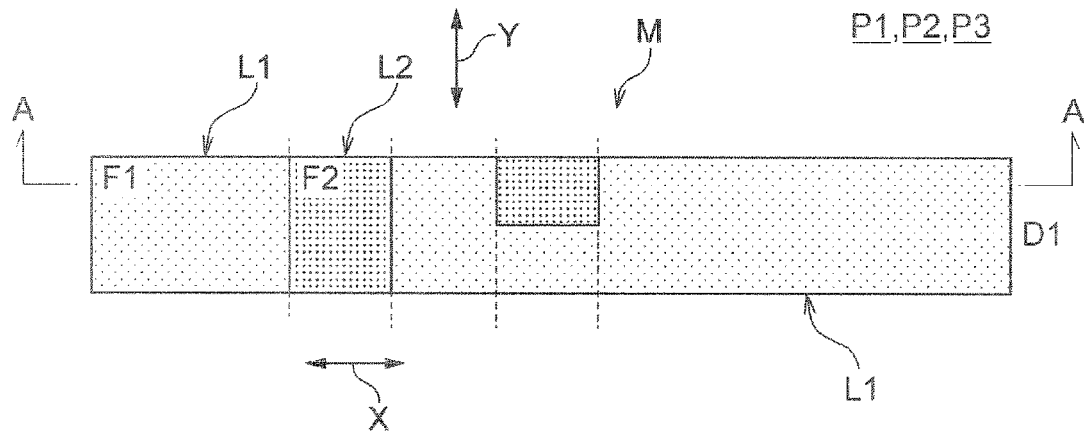
FIG. 8 is a plan view schematically showing an example of a three-dimensional structure manufactured by a manufacturing method for a three-dimensional structure according to a fourth embodiment of the invention.
Figure 9:
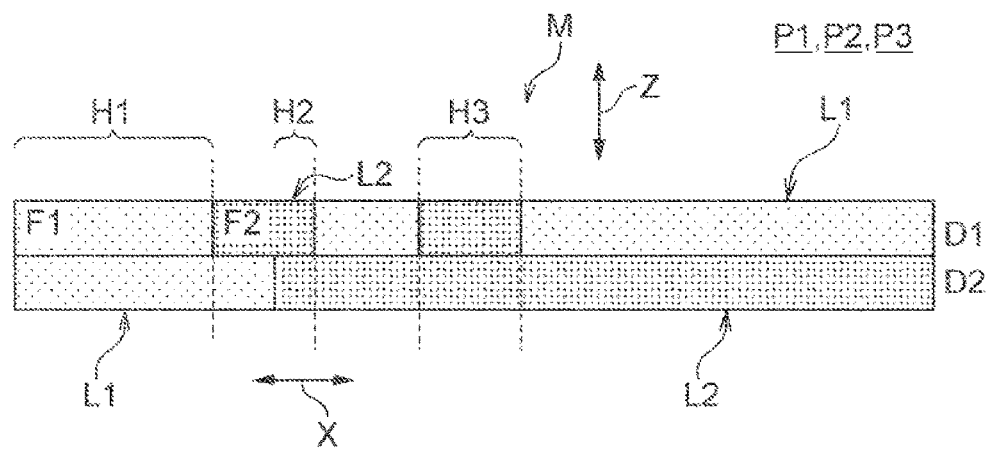
FIG. 9 is a longitudinal sectional front view taken along line A-A in FIG. 8 of the three-dimensional structure manufactured by the manufacturing method for the three-dimensional structure according to the fourth embodiment of the invention.

Fourth Embodiment (See FIGS. 8 and 9)

A manufacturing method for a three-dimensional structure according to the fourth embodiment is partially different from the manufacturing method in the second embodiment in the layer forming step P1 and is the same as the manufacturing method in the second embodiment in the solidifying step P2 and is the same as the manufacturing method in the third embodiment in the stacking step P3. Therefore, explanation of the solidifying step P2 and the stacking step P3 is omitted. Only content of the layer forming step P1 different from the content of the layer forming step P1 in the second and third embodiments is explained.

In this embodiment, the layer forming step P1 is performed by setting presence ratios and presence positions of the first flowable composition L1 including the powder F1 and the second flowable composition L2 including the second powder F2 in the unit layer D for each of parts (layers) in the stacking direction Z of the three-dimensional structure M.

In this embodiment, the first flowable composition L1 including the first powder F1 and the second flowable composition L2 including the second powder F2 are configured to present at least partially overlap when viewed from the stacking direction Z between the unit layers D vertically adjacent to each other.

Specifically, in FIGS. 8 and 9, in a lower unit layer D2, presence positions of the flowable compositions L1 and L2 disposed as shown in the figure are adopted where the presence ratio of the second flowable composition L2 including the second powder F2 is larger than the presence ratio of the first flowable composition L1 including the first powder F1.

On the other hand, in an upper unit layer D1, presence positions of the flowable compositions L1 and L2 disposed as shown in the figure are adopted where the presence ratio of the first flowable composition L1 including the first powder F1 is larger than the presence ratio of the second flowable composition L2 including the second powder F2. In the embodiment shown in the figure, in a range H1, the first flowable composition L1 overlaps. In ranges H2 and H3, the first flowable composition L1 and the second flowable composition L2 partially overlap. In other ranges, the first flowable composition L1 and the second flowable composition L2 entirely overlap.

Action and effects same as the action and effects in the second and third embodiments are exhibited by the manufacturing method for the three-dimensional structure according to this embodiment configured as explained above.

In this embodiment, it is possible to accurately exhibit the characteristics requested according to parts (layers) on the inside of the three-dimensional structure M and manufacture the three-dimensional structure M. Continuity in the stacking direction Z of changes in characteristics is improved in the ranges H2 and H3 where the flowable compositions L1 and L2 partially overlap.

Figure 10:
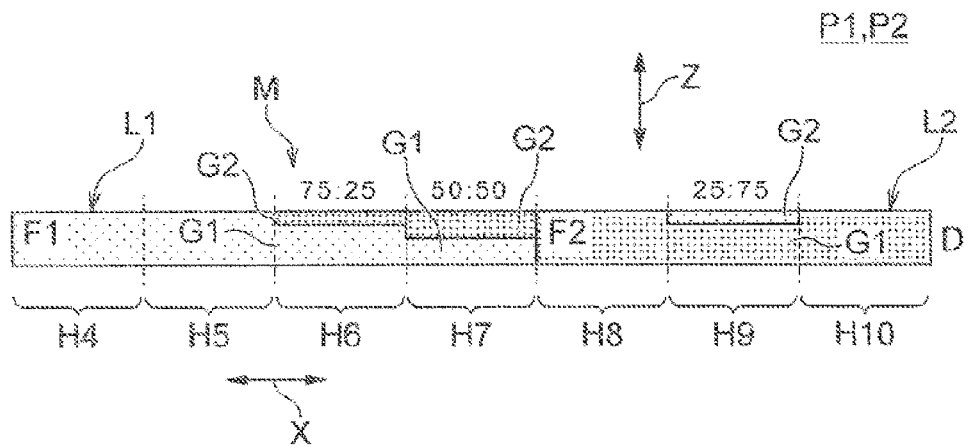
FIG. 10 is a longitudinal sectional front view schematically showing an example of a three-dimensional structure manufactured by a manufacturing method for a three-dimensional structure according to a fifth embodiment of the invention.

Fifth Embodiment (See FIG. 10)

A manufacturing method for a three-dimensional structure according to the fifth embodiment is partially different from the manufacturing method in the second embodiment in the layer forming step P1 and is the same as the manufacturing method in the second embodiment in the solidifying step P2. Therefore, explanation of the solidifying step P2 is omitted. Only content of the layer forming step P1 different from the content of the layer forming step P1 in the second embodiment is explained.

In this embodiment, at least a part of the unit layer D in a direction Z (the sign is the same as the sign of the stacking direction Z) along the unit layer D is formed by a plurality of sub-layers G1 and G2 in the layer forming step P1. The sub-layers G1 and G2 are formed by the flowable compositions L1 and L2 including the different kinds of powder F1 and F2.

Specifically, in the embodiment shown in the figure, the unit layer D is divided into, for example, seven ranges H4, H5, H6, H7, H8, H9, and H10. The sub-layers G1 and G2 are not provided in the ranges H4 and H5 and the ranges H8 and H10. The entire ranges H4 and H5 are formed by the first flowable composition L1 including the first powder F1. The entire ranges H8 and H10 are formed by the second flowable composition L2 including the second powder F2.

On the other hand, the sub-layers G1 and G2 are provided in the remaining three ranges H6, H7, and H9. In the ranges H6 and H7, the lower sub-layer G1 is formed by the first flowable composition L1 including the first powder F1 and the upper sub-layer G2 is formed by the second flowable composition L2 including the second powder F2. Presence ratios of the sub-layers G1 and G2 are set to 75:25, which indicates that the first flowable composition L1 is more than the second flowable composition L2, in the range H6 and are set to 50:50, which indicates that the two flowable compositions L1 and L2 are equal, in the range H7.

On the other hand, in the range H9, the lower sub-layer G1 is formed by the second flowable composition L2 including the second powder F2 and the upper sub-layer G2 is formed by the first flowable composition L1 including the first powder F1. The presence ratios of the sub-layers G1 and G2 are set to 25:75, which indicates that the second flowable composition L2 is more than the first flowable composition L1.

Action and effects same as the action and effects in the second embodiment are exhibited by the manufacturing method for the three-dimensional structure according to this embodiment configured as explained above.

In this embodiment, it is possible to manufacture the three-dimensional structure M adapted to characteristics more finely requested to the unit layers D.

Figure 11:
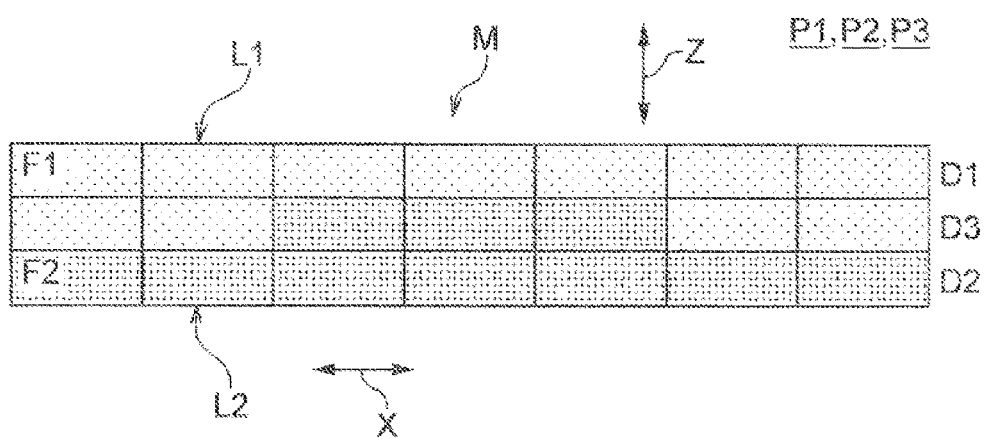
FIG. 11 is a longitudinal sectional front view schematically showing an example of a three-dimensional structure manufactured by a manufacturing method for a three-dimensional structure according to a sixth embodiment of the invention.

Sixth Embodiment (See FIG. 11)

A manufacturing method for a three-dimensional structure according to the sixth embodiment is a manufacturing method that can be applied when the three-dimensional structure M including three or more unit layers D is manufactured. Basic content of the layer forming step P1 and contents of the solidifying step P2 and the stacking step P3 are the same as the contents in the second and third embodiments explained above.

Therefore, explanation of the contents same as the contents in the second and third embodiments is omitted. Only content of the layer forming step P1 different from the content of the layer forming step P1 in the embodiments is explained.

In this embodiment, when the unit layers D1, D2, and D3 are formed, one end side (in the embodiment shown in the figure, the upper end side) in the stacking direction Z forms a first layer D1, which is an upper layer in the first flowable composition L1 including the first powder F1. The other end side (in the embodiment shown in the figure, the lower end side) in the stacking direction Z forms a second layer D2, which is a lower layer in the second flowable composition L2 including the second powder F2. Between the first layer D1 and the second layer D2, a composite material layer D3, which is an intermediate layer including the first flowable composition L1 including the first powder F1 and the second flowable composition L2 including the second powder F2, is formed.

In this embodiment, the three unit layers D1, D2, and D3 are stacked. Therefore, the composite material layer D3 is one layer. However, it is desirable to adopt disposition of the flowable compositions L1 and L2 based on so-called (inclined composition) in which a plurality of the composite material layers D3 are formed, the presence ratio of the first flowable composition L1 including the first powder F1 gradually decreases in a direction from the first layer D1 to the second layer D2, and the presence ratio of the second flowable composition L2 including the second powder F2 gradually increases in the direction from the first layer D1 to the second layer D2.

Action and effects same as the action and effects in the second and third embodiments are exhibited by the manufacturing method for the three-dimensional structure according to this embodiment configured as explained above.

In this embodiment, it is possible to adjust the inside of the three-dimensional structure M to appropriate characteristics in the stacking direction Z through adjustment of compositions (including the presence ratios and the presence positions) of the flowable compositions L1 and L2 of the composite material layer D3.

Further, by adopting the "inclined composition" in the stacking direction Z, it is possible to continuously change the characteristics imparted to the three-dimensional structure M from one side to the other side in the stacking direction. It is possible to reduce likelihood of occurrence of peeling and cracks between the unit layers D and between the sub-layers G in the stacking direction Z.

Figure 12:
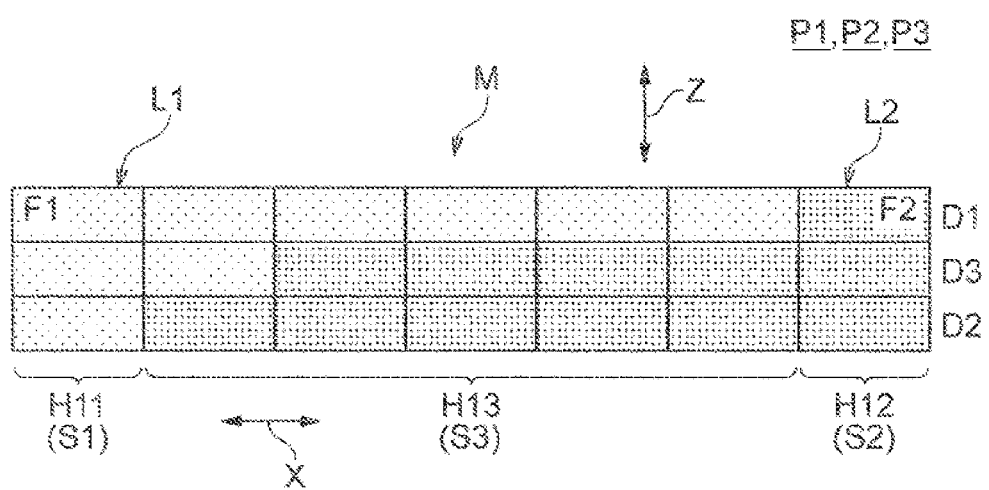
FIG. 12 is a longitudinal sectional front view schematically showing an example of a three-dimensional structure manufactured by a manufacturing method for a three-dimensional structure according to a seventh embodiment of the invention.

Seventh Embodiment (See FIG. 12)

A manufacturing method for a three-dimensional structure according to the seventh embodiment is different from the sixth embodiment in that the disposition of the first flowable composition L1 and the second flowable composition L2 is changed in the plane direction (in the embodiment shown in the figure, the first direction X serving as the width direction) whereas the disposition is changed in the stacking direction Z in the sixth embodiment.

Basic content of the layer forming step P1 and contents of the solidifying step P2 and the stacking step P3 are the same as the contents in the second and third embodiments as in the sixth embodiment.

Therefore, explanation of the contents same as the contents in the second and third embodiments is omitted. Only content of the layer forming step P1 different from the content of the layer forming step P1 in the embodiments is explained.

In this embodiment, the unit layers D1, D2, and D3 are divided into a range H11 on one side end (left side end in the figure) side in the plane direction (in the embodiment shown in the figure, the first direction X serving as the width direction), a range H12 on the other side end (right side end in the figure) side in the plane direction, and an intermediate range H13 between the ranges H11 and H12. A first side end layer S1 is formed by the first flowable composition L1 including the first powder F1 in the range H11 on the one side end side. A second side end layer S2 is formed by the second flowable composition L2 including the second powder F2 in the range H12 on the other side end side. A composite material layer S3 including the first flowable composition L1 including the first powder F1 and the second flowable composition L2 including the second powder F2 is formed in the intermediate range H13.

In this embodiment, the disposition of the flowable compositions L1 and L2 based on the so-called "inclined composition" in which the composite material layer S3 is formed such that the presence ratio of the first flowable composition L1 including the first powder F1 gradually decreases in a direction from the first side end layer S1 to the second side end layer S2 and the presence ratio of the second flowable composition L2 including the second powder F2 gradually increases in the direction from the first side end layer S1 to the second side end layer S2.

Action and effects same as the action and effects in the second and third embodiments are exhibited by the manufacturing method for the three-dimensional structure according to this embodiment configured as explained above.

In this embodiment, it is possible to adjust the inside of the three-dimensional structure M to appropriate characteristics in the plane direction (in the embodiment shown in the figure, the first direction X serving as the width direction) through adjustment of compositions (including the presence ratios and the presence positions) of the flowable compositions L1 and L2 of the composite material layer S3.

Further, by adopting the "inclined composition" in the plane direction (in the embodiment shown in the figure, the first direction X serving as the width direction), it is possible to continuously change the characteristics imparted to the three-dimensional structure M from one side to the other side in the plane direction (the first direction X). It is possible to reduce likelihood of occurrence of peeling and cracks between the flowable compositions L1 and L2 in the plane direction (the first direction X).

Figure 13:
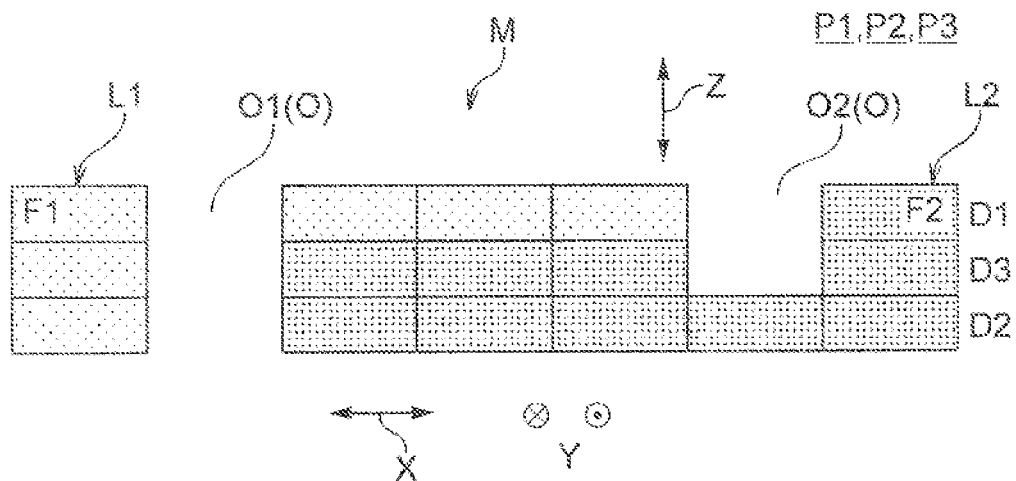
FIG. 13 is a longitudinal sectional front view schematically showing an example of a three-dimensional structure manufactured by a manufacturing method for a three-dimensional structure according to an eighth embodiment of the invention.

Eighth Embodiment (See FIG. 13)

A manufacturing method for a three-dimensional structure according to the eighth embodiment is different from the manufacturing method in the second and third embodiments in a part of content of the layer forming step P1. Basic content of the layer forming step P1 and contents of the solidifying step P2 and the stacking step P3 are the same as the contents in the second and third embodiments.

Therefore, explanation of the contents same as the contents in the second and third embodiments is omitted. Only content of the layer forming step P1 different from the content of the layer forming step P1 in the embodiments is explained.

In this embodiment, in the layer forming step P1, voids O are formed in a part in the unit layers D.

As a form of the voids O, for example, a through-hole O1 piercing through in the stacking direction Z and a recessed section O2 not piercing through in the stacking direction Z and closed in the bottom shown in FIG. 13 can be adopted.

Action and effects same as the action and effects in the second and third embodiments are exhibited by this embodiment configured as explained above.

In this embodiment, it is possible to easily provide the through-hole O1, the recessed section O2, and the like on the basis of parts (layers) of the three-dimensional structure M. It is possible to contribute to a reduction in the weight, saving of materials, and the like of the three-dimensional structure M.

Figure 14:
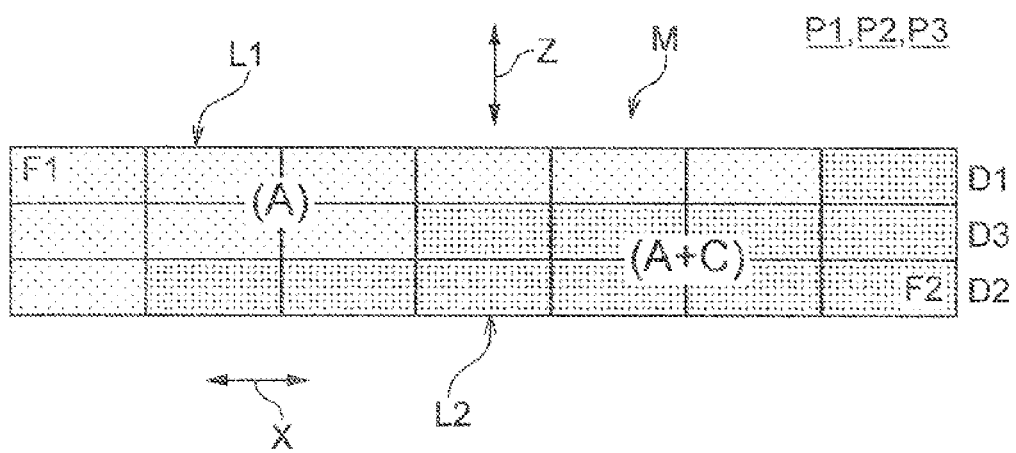
FIG. 14 is a longitudinal sectional front view schematically showing an example of a three-dimensional structure manufactured by a manufacturing method for a three-dimensional structure according to a ninth embodiment of the invention.
Figure 15:
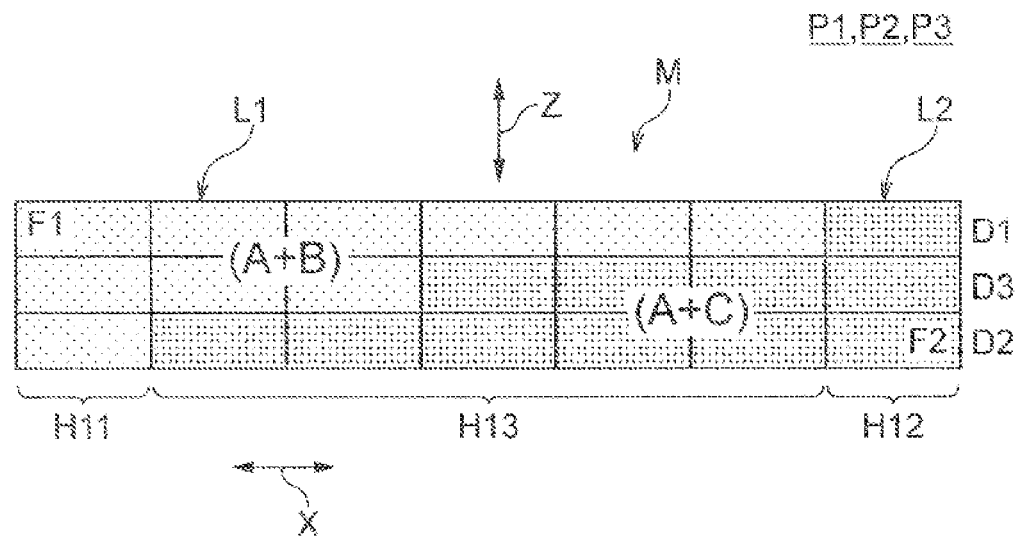
FIG. 15 is a longitudinal sectional front view schematically showing another example of the three-dimensional structure manufactured by the manufacturing method for the three-dimensional structure according to the ninth embodiment of the invention.

Ninth Embodiment (See FIGS. 14 and 15)

In a manufacturing method for a three-dimensional structure according to the ninth embodiment, at least one of the first powder F1 and the second powder F2 used in the layer forming step P1 is formed of mixed powder. Therefore, basic content of the layer forming step P1 and content of the solidifying step P2 are the same as the contents in the second embodiment. Therefore, explanation of the contents same as the contents in the second embodiment is omitted. Only the powder F used in the layer forming step P1 different from the powder in the second embodiment 2 is explained.

In this embodiment, at least one of the first powder F1 included in the first flowable composition L1 and the second powder F2 included in the second flowable composition L2 used in the layer forming step P1 is formed of mixed powder including a plurality of kinds of powder F. The first powder F1 and the second powder F2 include at least one kind of the same powder F.

Specifically, as shown in FIG. 14, the first powder F1 is formed of the powder A and the second powder F2 is formed of mixed powder of the powder A and the powder C. As shown in FIG. 15, the first powder F1 can be formed of mixed powder of the powder A and the powder B and the second powder F2 can be formed of the mixed powder of the powder A and the powder C. In the embodiment shown in FIGS. 14 and 15, the same powder A is included in the first powder F1 and the second powder F2.

Action and effects same as the action and effects in the second embodiment can be exhibited by this embodiment configured as explained above.

In this embodiment, it is possible to easily provide various characteristics in the three-dimensional structure M according to adjustment of compositions including a mixing ratio of the mixed powder. The first powder F1 and the second powder F2 include the same component (in the embodiment shown in the figure, the powder A). Therefore, it is possible to moderate a change in the characteristics between the flowable compositions L1 and L2 of the different kinds. It is possible to reduce likelihood of occurrence of peeling and cracks between the flowable compositions L1 and L2 and between the unit layers D.

Figure 16:
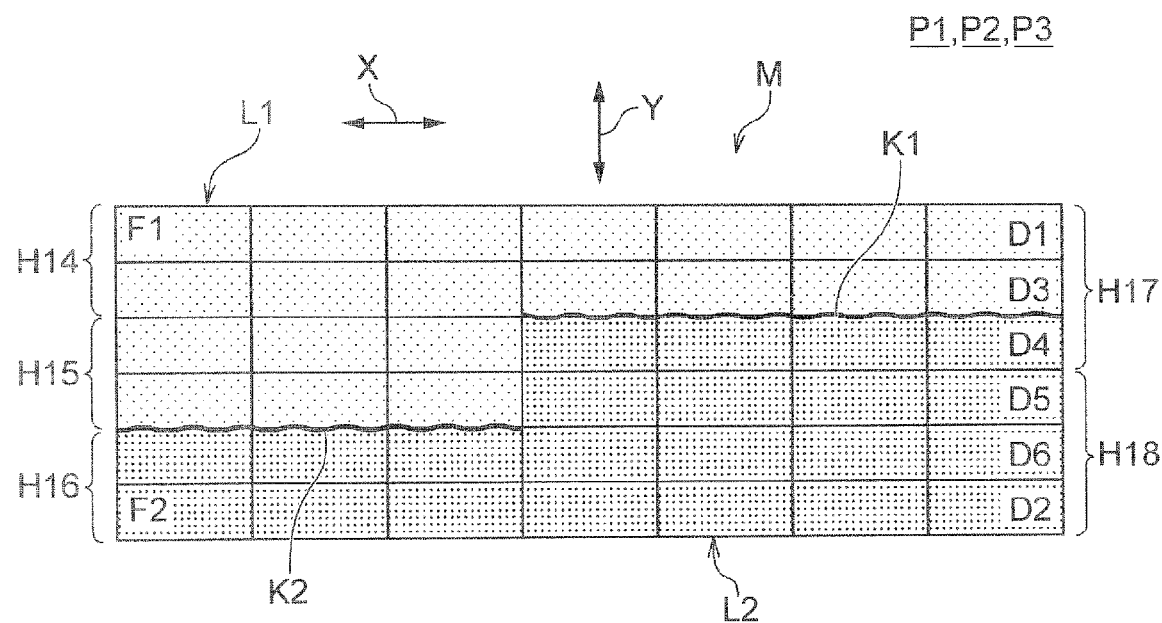
FIG. 16 is a longitudinal sectional front view schematically showing an example of a three-dimensional structure manufactured by a manufacturing method for a three-dimensional structure according to a tenth embodiment of the invention.

Tenth Embodiment (See FIG. 16)

A manufacturing method for a three-dimensional material according to the tenth embodiment has characteristics in a target range and a solidifying unit of solidification of the flowable compositions L performed in the solidifying step P2. Note that basic content of the solidifying step P2 and contents of the layer forming step P1 and the stacking step P3 are the same as the contents in the second and third embodiments.

Therefore, explanation of the contents same as the contents in the second and third embodiments is omitted. Only the content of the solidifying step P2 different from the content in the embodiments is explained.

In this embodiment, in the solidification of the flowable compositions L, it is possible to perform the solidification of the flowable compositions L for each layer every time the unit layer D is formed and perform the solidification of the flowable compositions L for each plurality of unit layers (in the embodiment shown in the figure, unit layers D1 and D3, D4 and D5, or D6 and D2) in which the co-presence states of the first flowable composition L1 and the second flowable composition L2 are the same as indicated by ranges H14, H15, and H16 in FIG. 16.

In this embodiment, in the solidification of the flowable compositions L, it is possible to perform the solidification of the flowable compositions L or each plurality of unit layers (in the embodiment shown in the figure, unit layers D1, D3, and D4 or D5, D6, and D2) including at least both unit layers adjacent to each other (in the embodiment shown in the figure, unit layers D3 and D4 or D5 and D6) including interfaces K1 and K2 in which the co-presence states of the first flowable composition L1 and the second flowable composition L2 are different as indicated by ranges H17 and H18 in FIG. 16 and perform, after the layer forming step P1 is completed for all the layers, the solidification of the flowable compositions L targeting the entire flowable compositions L in all the layers.

As the solidifying unit used in the solidifying step P2, it is possible to adopt, as an example, a solidifying unit by means of melting performed by radiating the laser beam E with the radiating section 7. Further, it is possible to adopt, instead of the solidifying unit explained above, solidifying unit by means of sintering performed by putting the flowable compositions L in a sintering furnace or the like or use the solidifying unit by means of melting and the solidifying unit by means of sintering in combination as appropriate.

Action and effects same as the action and effects in the second and third embodiments can be exhibited by this embodiment configured as explained above.

In this embodiment, when the solidification of the flowable compositions L is performed for each of the unit layers D, it is possible to equalize a change in the characteristics in the unit layer D and regularly execute the solidification of the flowable compositions L.

When the solidification of the flowable compositions L is performed for each plurality of unit layers D in which the co-presence states of both the kinds of powder F1 and F2 are the same, it is possible to equalize a change in the characteristics in the plurality of unit layer D portions in which the co-presence states are the same and efficiently execute the solidification of the flowable compositions L.

When the solidification of the flowable compositions L is performed for each plurality of unit layers D including both the unit layers D sandwiching the interfaces K1 and K2 in which the presence ratios are different, a sudden change in the characteristics in the interfaces K1 and K2 is moderated.

After the layer forming step P1 is completed, when the solidification of the flowable compositions L is performed targeting the entire flowable compositions L of all the layers, it is possible to moderate a change in the characteristics of the three-dimensional structure M as a whole. In particular, this form is suitable when the solidifying unit by sintering is adopted.

When the solidification of the flowable compositions L is performed using the laser beam E, it is possible to easily perform the solidification of the flowable compositions L targeting only necessary parts.

Eleventh Embodiment (See FIGS. 17A to 17D)

A manufacturing apparatus 1B for a three-dimensional structure according to the eleventh embodiment has characteristics in a supply form of the first flowable composition L1 and the second flowable composition L2 used in the formation of the unit layers D and a formation form of the unit layers D. The other components of the manufacturing apparatus 1B for the three-dimensional structure are the same as the components of the manufacturing apparatus 1A for the three-dimensional structure according to the first embodiment.

Therefore, explanation of the components same as the components in the first embodiment is omitted. Components peculiar to this embodiment different from the components in the first embodiment and a flow of manufacturing of the three-dimensional structure M configured by supply of the flowable compositions L, formation of the unit layers D, and solidification executed by the specific components are mainly specifically explained.

(1) Components Peculiar to the Manufacturing Apparatus for the Three-Dimensional Structure In the manufacturing apparatus 1B for the three-dimensional structure according to this embodiment, a first cylinder chamber 61, which stores the first flowable composition L1, and a second cylinder chamber 63, which stores the second flowable composition L2, are provided side by side beside the stage 3. A first piston 65 and a second piston 67 capable of independently moving up and down in the stacking direction Z are respectively disposed in the cylinder chambers 61 and 63.

In FIGS. 17A to 17D, above the second cylinder chamber 63 located on the left, a coating roller 69 for supplying the flowable compositions L1 and L2 onto the layer forming region 13 on the stage 3 or the formed unit layer D and forming a coating film having predetermined thickness is disposed. The coating roller 69 is configured to be capable moving in a range from a position slightly further outward (leftward in the embodiment shown in the figure) than the top of the second cylinder chamber 63 to, through the layer forming region 13 on the stage 3, a position facing a collection port 77 above a collection chute 75 further slightly outward (rightward in the embodiment shown in the figure) than the layer forming region 13.

In this embodiment, a mask 71, in which holes 72 are formed in places corresponding to the presence ratios and the presence places of the first flowable composition L1 in the unit layer D to be formed, is prepared for each of the unit layers D.

Note that, as the mask 71, a flat member made of synthetic resin or metal excellent in peelability from the flowable compositions L in use can be adopted as an example.

(2) Flow of Manufacturing of the Three-Dimensional Structure

When the three-dimensional structure M is manufactured using the manufacturing apparatus 1B for the three-dimensional structure having the configuration explained above, work is advanced in the order of (A) preparation of the flowable compositions, (B) coating of the first flowable composition, (C) coating of the second flowable composition, and (D) solidification of the flowable compositions. Content of the work is explained below.

Figure 17A:
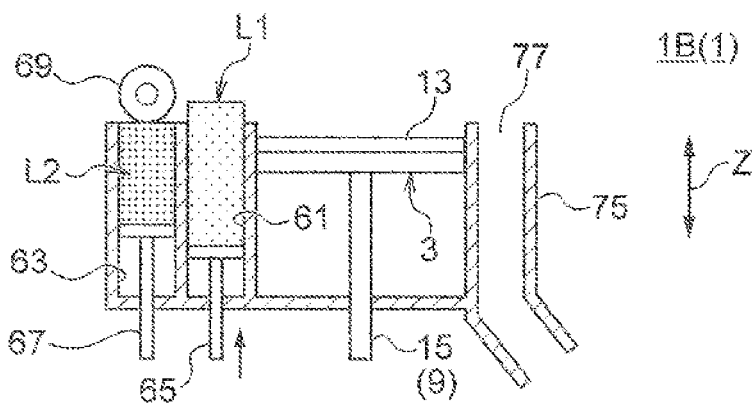
FIGS. 17A to 17D are longitudinal sectional front views showing the configuration of a manufacturing method for a three-dimensional structure and showing, stepwise, a manufacturing process for a three-dimensional structure according to an eleventh embodiment of the invention.

(A) Preparation of the Flowable Compositions (See FIG. 17A)

The first flowable composition L1 is filled in the first cylinder chamber 61 by a necessary amount. The second flowable composition L2 is filled in the second cylinder chamber 63 by a necessary amount. Subsequently, the first piston 65 is moved upward by a predetermined amount necessary for formation of the unit layer D. The stage 3 is set at predetermined height for forming the unit layer D. The coating roller 69 is located in a position outside the first cylinder chamber 61 and above the second cylinder chamber 63.

Figure 17B:
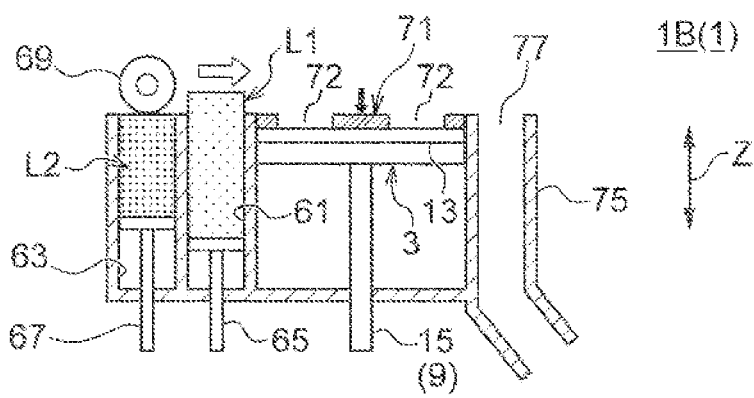
Figure 17C:
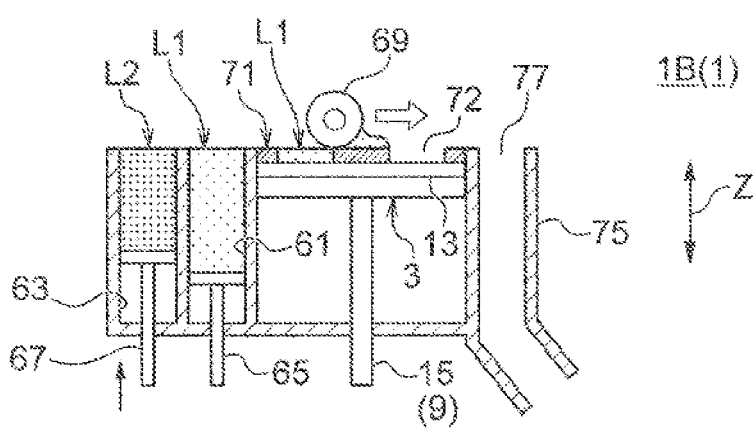

(B) Coating of the First Flowable Composition (See FIGS. 17B and 17C)

The mask 71 is set on the stage 3 in a predetermined direction.

Subsequently, the coating roller 69 is moved to the stage 3 side. At this point, the coating roller 69 is moved onto the stage 3 to scrape off the first flowable composition L1 in a part projecting from the upper surface of the first cylinder chamber 61. The first flowable composition L1 is filled in the holes 72 of the set mask 71. Note that the coating roller 69 is moved to a position facing the collection port 77 above the collection chute 75 outside the layer forming region 13 on the stage 3 and used to discharge and collect the excessive first flowable composition L1 in the collection chute 75.

Figure 17D:
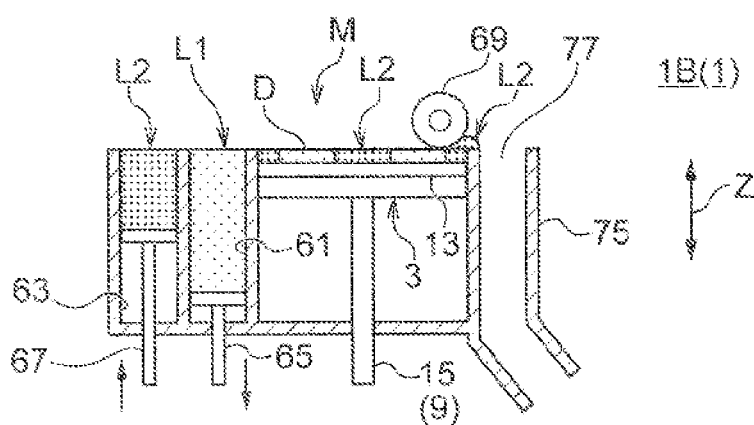

(C) Coating of the Second Flowable Composition (See FIG. 17D)

The coating roller 69 is moved to a supply start position of the second flowable composition L2 outside the second cylinder chamber 63. The second piston 67 is moved upward by a predetermined amount necessary for the formation of the unit layer D. The set mask 71 is removed.

Subsequently, the coating roller 69 is moved to the stage 3 side. At this point, the coating roller 69 is moved onto the stage 3 to scrape off the second flowable composition L2 in a part projecting from the upper surface of the second cylinder chamber 63. A part where the first flowable composition L1 formed earlier is absent is filled with the second flowable composition L2. Note that the coating roller 69 is moved to the position facing the collection port 77 above the collection chute 75 outside the layer forming region 13 on the stage 3 and used to discharge and collect the excessive second flowable composition L2 in the collection chute 75.
(D) Solidification of the Flowable Compositions The coating roller 69 is retracted from the layer forming region 13. The flowable compositions L1 and L2 are solidified using a solidifying unit by means of melting performed by radiating a laser beam radiated from a not-shown radiating section or solidifying unit by means of sintering performed using a sintering furnace or the like.

Action and effects same as the action and effects of the manufacturing apparatus 1A for the three-dimensional structure according to the first embodiment are exhibited by the manufacturing apparatus 1B for the three-dimensional structure according to this embodiment configured as explained above. It is possible to impart characteristics requested according to parts on the inside of the three-dimensional structure M to the three-dimensional structure M by adjusting the presence ratios and the presence positions of the flowable compositions L1 and L2.

Figure 18:
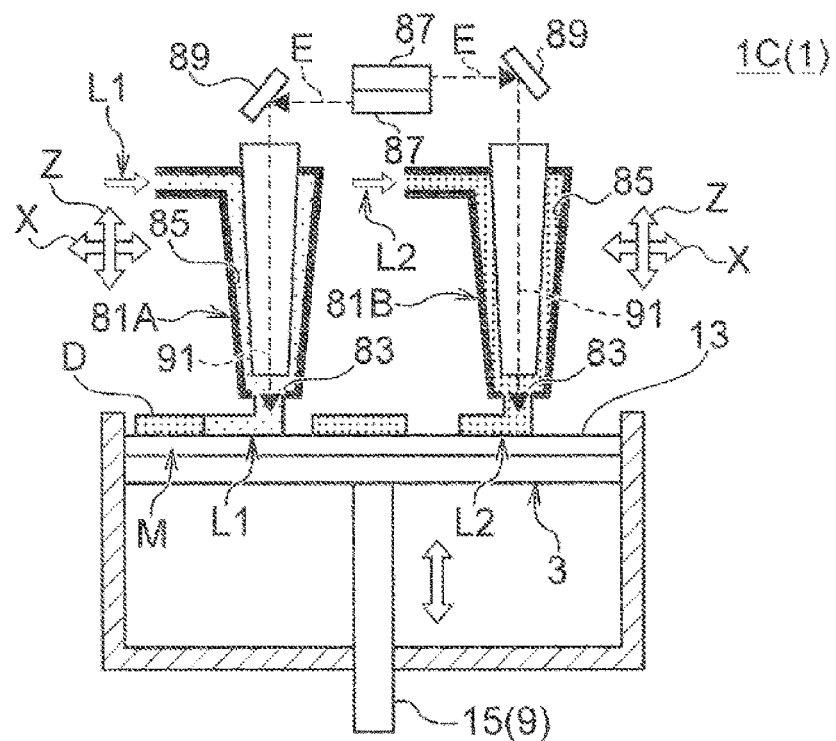
FIG. 18 is a longitudinal sectional front view showing the configuration of a manufacturing method for a three-dimensional structure and showing a manufacturing process for a three-dimensional structure according to a twelfth embodiment of the invention.

Twelfth Embodiment (See FIG. 18)

A manufacturing apparatus 1C for a three-dimensional structure according to the twelfth embodiment is a manufacturing apparatus for a three-dimensional structure configured to heat in advance predetermined regions to be forming parts of the flowable compositions L1 and L2 and execute solidification by discharge and melting of the flowable compositions L1 and L2 at substantially the same timing. Note that the other components are the same as the components of the manufacturing apparatus 1A according to the first embodiment.

Therefore, explanation of the components same as the components in the first embodiment is omitted. Components peculiar to this embodiment different from the components in the first embodiment and a flow of manufacturing of the three-dimensional structure M executed by the specific components are mainly specifically explained.
(1) Components Peculiar to the Manufacturing Apparatus for the Three-Dimensional Structure The manufacturing apparatus 1C for the three-dimensional structure according to the invention includes two supply nozzles 81A and 81B as a supply unit of the flowable compositions L1 and L2. Supply passages 85 for leading the flowable compositions L1 and L2 to nozzle openings 83 are formed on the outer circumferential surface sides of the supply nozzles 81A and 81B. On the insides of the supply nozzles 81A and 81B, optical paths 91 for leading the laser beam E generated by a laser generating device 87 and condensed using optical system members such as lenses 89 to the flowable compositions L1 and L2 in machining parts are formed.
(2) Flow of Manufacturing of the Three-Dimensional Structure When the three-dimensional structure M is manufactured using the manufacturing apparatus 1C for the three-dimensional structure having the configuration explained above, the first flowable compositions L1 is led to the supply passage 85 of the supply nozzle 81A, the second flowable composition L2 is led to the supply passage 85 of the supply nozzle 81B, and the first flowable composition L1 and the second flowable composition L2 are discharged toward the discharge region 13 from the respective nozzle openings 83.

On the other hand, the laser beam E generated by the laser generating device 87 is condensed by the optical system members such as the lenses 89 and thereafter radiated toward the discharge region 13 on the stage 3 present in the machining part through the respective optical paths 91 formed inside the supply nozzles 81A and 81B.

The flowable compositions L1 and L2 are discharged in a state in which the flowable compositions L1 and L2 are transported by transportation gas and jetted from the nozzle openings 83 together with the transportation gas.

Consequently, the discharge region 13 on the stage 3 is heated in advance by the laser beam E. The flowable compositions L1 and L2 discharged to the heated discharge region 13 are melted and solidified by the laser beam E and formed in a predetermined unit layer D or a predetermined three-dimensional structure M at substantially the same timing as the discharge from the supply nozzles 81A and 81B to the discharge region 13.

Action and effects same as the action and effects of the manufacturing apparatus 1A for the three-dimensional structure according to the first embodiment are exhibited by the manufacturing apparatus 1C for the three-dimensional structure according to this embodiment configured as explained above. It is possible to impart characteristics requested according to parts on the inside of the three-dimensional structure M to the three-dimensional structure M by adjusting the presence ratios and the presence positions of the flowable compositions L1 and L2.
Stacking Model of the Three-Dimensional Structure (See FIGS. 19 and 20)

Figure 19:
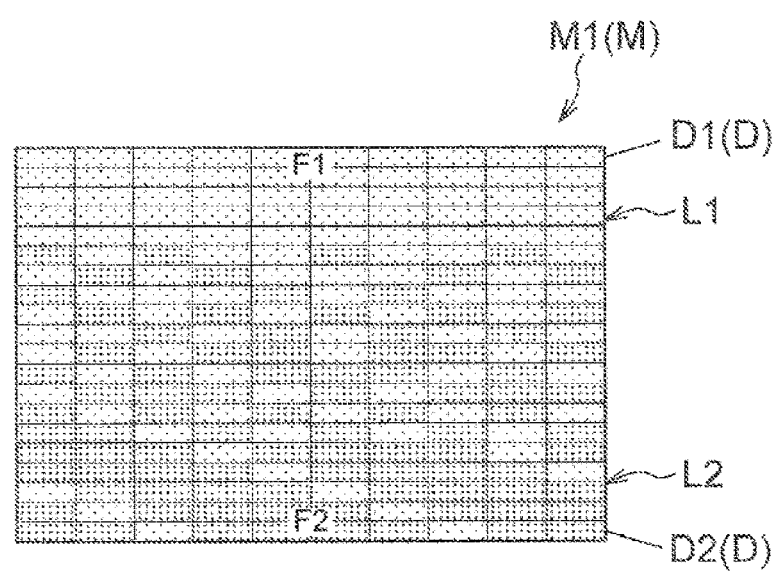
FIG. 19 is a longitudinal sectional front view schematically showing an example of a stacking model of the three-dimensional structure manufactured by the manufacturing method for the three-dimensional structure according to the second to tenth embodiments of the invention.
Figure 20:
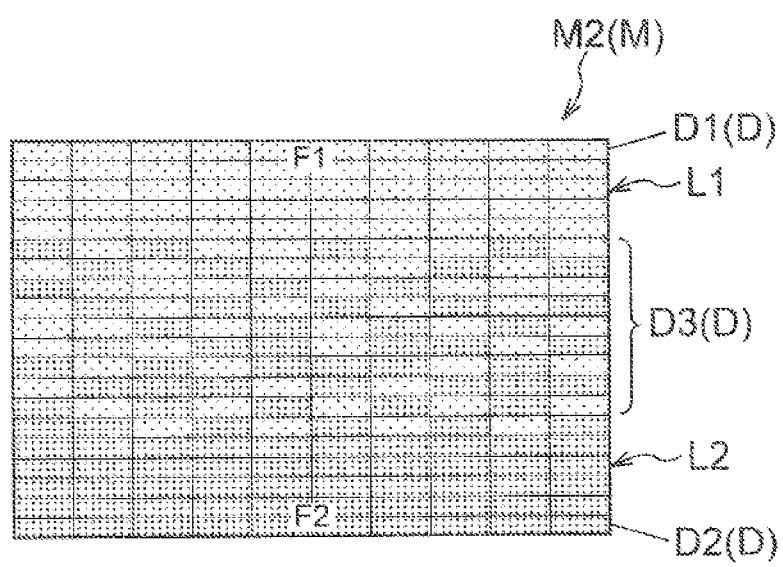
FIG. 20 is a longitudinal sectional front view schematically showing another example of the stacking model of the three-dimensional structure manufactured by the manufacturing method for the three-dimensional structure according to the second to tenth embodiments of the invention.

As a stacking model of the three-dimensional structure M, a stacking model M1 not including an "inclined composition" in a boundary region shown in FIG. 19 and a stacking model M2 including the "inclined composition" in a boundary region shown in FIG. 20 are exemplified. Differences between the stacking models M1 and M2 are explained concerning three forms of examples 1 to 3 in which a combination of the first flowable composition L1 and the second flowable composition L2 is changed.

Example 1

In this example, in the stacking model M2 including the "inclined composition" shown in FIG. 20, lower five layers D are formed of oxide paste (e.g., alumina) as the second flowable composition L2. Upper five layers D are formed of metal paste (e.g., stainless steel) as the first flowable composition L1. Intermediate ten layers D are formed as the composite material layer D3 in which the first flowable composition L1 and the second flowable composition L2 are mixed.

In this case, in the stacking model M1 not including the "inclined composition" shown in FIG. 19, it is likely that peeling and cracks occur in the boundary region because of a thermal expansion difference between the first flowable composition L1 and the second flowable composition L2. However, in the stacking model M2 including the "inclined composition" shown in FIG. 20, the influence due to the thermal expansion difference between the first flowable composition L1 and the second flowable composition L2 is suppressed. Therefore, the likelihood of occurrence of peeling and cracks in the boundary region is reduced and a satisfactory three-dimensional structure M is obtained.

Example 2

In this example, in the stacking model M2 including the "inclined composition" shown in FIG. 20, lower five layers D are formed of metal paste (e.g., stainless steel) as the second flowable composition L2. Upper five layers D are formed of mixed paste of metal powder (e.g., stainless steel) and diamond powder as the first flowable composition L1. Intermediate ten layers D are formed as the composite material layer D3 in which the first flowable composition L1 and the second flowable composition L2 are mixed.

In this case, as in the example 1, in the stacking model M2 including the "inclined composition" shown in FIG. 20, it is possible to reduce the likelihood of occurrence of peeling and cracks in the boundary region. Further, in this example, when the upper five layers D formed by only the first flowable composition L1 formed of the mixed paste including the diamond powder are disposed on the outermost layer of the three-dimensional structure M, abrasion resistance of the three-dimensional structure M is improved. It is possible to refine and improve surface characteristics of the three-dimensional structure M.

Example 3

In this example, in the stacking model M2 including the "inclined composition" shown in FIG. 20, lower five layers D are formed of mixed paste of metal powder (e.g., stainless steel) and alumina powder as the second flowable composition L2. Upper five layers D are formed of mixed paste of metal powder (e.g., stainless steel) and diamond powder as the first flowable composition L1. Intermediate ten layers D are formed as the composite material layer D3 in which the first flowable composition L1 and the second flowable composition L2 are mixed.

In this case, as in the example 1, in the stacking model M2 including the "inclined composition" shown in FIG. 20, it is possible to reduce the likelihood of occurrence of peeling and cracks in the boundary region. Further, in this example, when the upper five layers D formed by only the first flowable composition L1 formed of the mixed paste including the diamond powder are disposed on the outermost layer of the three-dimensional structure M, as in the example 2, abrasion resistance of the three-dimensional structure M is improved. The occurrence of peeling, cracks, and the like on the surface of the three-dimensional structure M is also reduced.

Figure 21:
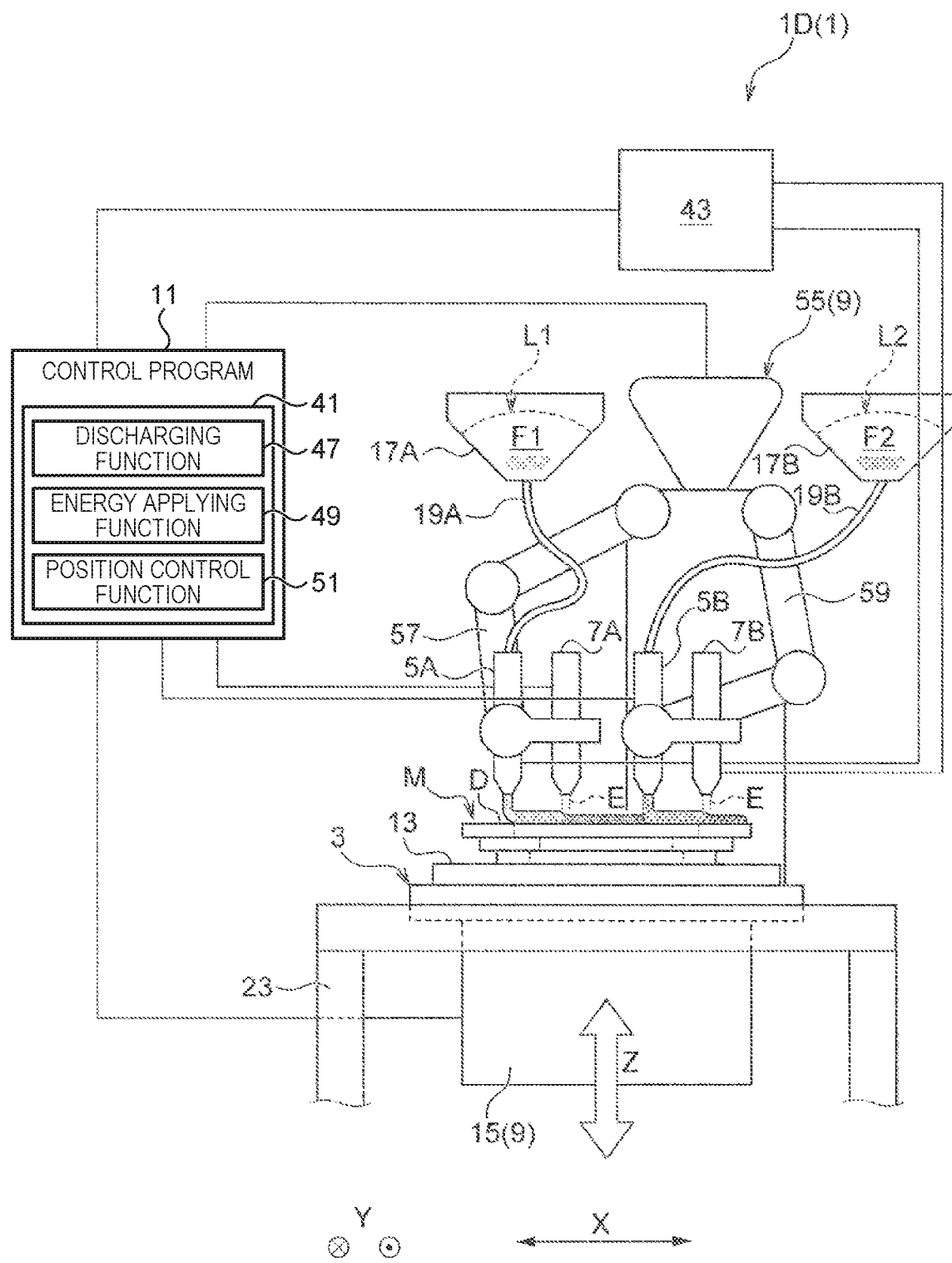
FIG. 21 is a front view showing the overall configuration of a manufacturing apparatus for a three-dimensional structure according to a thirteenth embodiment of the invention.

Thirteenth Embodiment (See FIG. 21)

In a manufacturing apparatus 1D for a three-dimensional structure according to the thirteenth embodiment, the functions of the first driving device 21 and the second driving device 35 in the manufacturing apparatus 1A for the three-dimensional structure according to the first embodiment are performed by an industrial robot 55. Therefore, components other than the industrial robot 55 are the same as the components in the first embodiment. Therefore, detailed explanation of the components is omitted. A moving operation of the discharge heads 5 and radiating sections 7 in a first direction X and a second direction Y performed using the industrial robot 55 is mainly explained.

In this embodiment, the industrial robot 55 of, for example, a double-arm multi-joint type is used. The discharge head 5A and a radiating section 7A and the discharge head 5B and a radiating section 7B are respectively supported by separate robot arms 57 and 59. The discharge head 5A and the radiating section 7A and the discharge head 5B and the radiating section 7B can be moved in the three-dimensional directions X, Y, and Z independently from each other.

Therefore, unlike the configuration in which the first driving device 21 and the second driving device 35 in the first embodiment respectively move the discharge heads 5 and the radiating section 7 only in the first direction X and the second direction Y, it is possible to form the layers D having a complicated structure in which undulations in the stacking direction Z are present in one layer D.

Action and effects same as the action and effects of the manufacturing apparatus 1A for the three-dimensional structure according to the first embodiment can be exhibited by the manufacturing apparatus 1D for the three-dimensional structure according to this embodiment configured as explained above. In this embodiment, the size of the three-dimensional structure M that can be formed is regulated by the arm length of the robot arms 57 and 59. Therefore, in general, the size is smaller than the size in the first embodiment. However, with the characteristics of the robot arms 57 and 59 that can move in the three-dimensional directions X, Y, and Z, it is possible to form the three-dimensional structure M having a shape more complicated than the three-dimensional structure M the first embodiment.

Other Embodiments

The manufacturing method for the three-dimensional structure, the manufacturing apparatus 1 for the three-dimensional structure, and the control program 41 for the manufacturing apparatus 1 according to the invention basically have the configurations explained above. However, it is naturally possible to, for example, change and omit partial configurations without departing from the spirit of the invention.

For example, the flowable compositions L1 and L2 serving as the materials are not always limited to paste-like materials including the kinds of powder F1 and F2. It is possible to directly discharge or drop metal powder or the like to the layer forming region 13 to form the unit layers D. However, in this case, it is necessary to take into account an angle of rest, which is a limit angle at which the powder F does not start to slip.

In the embodiments, as an example, the two kinds of flowable compositions L1 and L2 are used. However, the fluidic materials L are not limited to two kinds. Three or more kinds of the fluidic materials L may be used. Therefore, as the flowable compositions L used in this specification, one kind of the first flowable composition L1 and one kind of the second flowable composition L2 are provided. Besides, a plurality of kinds of one or both of the first flowable composition L1 and the second flowable composition L2 can be provided.

Further, the manufacturing apparatus 1 for the three-dimensional structure according to the invention is not limited to individually including the configurations explained in the embodiment and can be a manufacturing apparatus M for a three-dimensional structure in which the configurations are replaced or combined as appropriate.

The entire disclosure of Japanese patent No. 2015-212632, filed Oct. 29, 2015 is expressly incorporated by reference herein.

What is claimed is:

1. A manufacturing method for a three-dimensional structure comprising:

causing a laser to heat a stage on which a first composition and/or a second composition is subsequently to be dispersed on such that the stage is heated in advance of the first composition and/or the second composition being deposited thereon;

subsequent to the stage being heated by the laser, forming unit layers on the stage using the first composition, which includes first powder, and the second composition, which includes second powder, the first composition being discharged from a first supply nozzle and the second composition being discharged from a second supply nozzle, the first powder included in the first composition and the second powder included in the second composition are mixed powders including a plurality of powders, wherein the mixed powders include a third powder, and the first powder and the second powder include the third powder; and solidifying the first powder and the second powder in the unit layers by directing at least one of a first energy beam toward the first powder and a second energy beam toward the second powder, the first energy beam being directed along an optical path disposed within a supply passage of the first supply nozzle, the first composition encircling the optical path, wherein, in the forming the unit layers, both of the first composition and the second composition are caused to be present in a stacking direction and in a plane direction crossing a thickness direction of the unit layers, wherein, the unit layers in the stacking direction and between a first side and a second side of the unit layers in the plane direction have an inclined composition of the first powder and the second powder in which a presence ratio of the second composition increases in the stack direction and from the first side toward the second side, wherein a first laser provides the first energy beam and a second laser provides the second energy beam, the first laser and the second laser are positioned between, relative to a direction of the optical path disposed within the supply passage of the first supply nozzle, the first supply nozzle and the second supply nozzle, wherein the first laser emits the first energy beam in a first direction that intersects the direction of the optical path, and the second laser also emits the second energy beam in a second perpendicular direction that intersects the direction of the optical path, and wherein a first mirror redirects the first energy beam from the first direction to the direction of the optical path, and a second mirror redirects the second energy beam from the second direction to the direction of the optical path.

2. The manufacturing method for the three-dimensional structure according to claim 1, further comprising repeating the forming the unit layers in the stacking direction.

3. The manufacturing method for the three-dimensional structure according to claim 1, wherein the forming the unit layers is performed by setting presence ratios and presence positions of the first powder and the second powder in the unit layers for each of parts or layers in the stacking direction of the three-dimensional structure.

4. The manufacturing method for the three-dimensional structure according to claim 1, wherein the first composition including the first powder and the second composition including the second powder are caused to be present to at least partially overlap when viewed from the stacking direction between the unit layers adjacent to each other.

5. The manufacturing method for the three-dimensional structure according to claim 1, wherein, in the forming the unit layers, the unit layers are formed by discharging, with a discharging unit, at least one of the first composition and the second composition.

6. The manufacturing method for the three-dimensional structure according to claim 1, wherein, in the forming the unit layers, the unit layers are formed by pluralities of sub-layers in at least parts of the unit layers in a direction along the unit layers, and the sub-layers are formed of compositions including different kinds of powder.

7. The manufacturing method for the three-dimensional structure according to claim 1, wherein, in the forming the unit layers, a void is formed in a part in the unit layers.

8. The manufacturing method for the three-dimensional structure according to claim 1, wherein the solidifying the powder is performed for each of the unit layers.

9. The manufacturing method for the three-dimensional structure according to claim 1, wherein the solidifying the powder is performed for each plurality of unit layers in which states of the first composition and the second composition are the same.

10. The manufacturing method for the three-dimensional structure according to claim 1, wherein the solidifying the powder is performed for each plurality of unit layers including at least both the unit layers adjacent to each other including interfaces in which states of the first composition and the second composition are different.

11. The manufacturing method for the three-dimensional structure according to claim 1, wherein the solidifying the powder is performed after the forming the unit layers is completed.

12. The manufacturing method for the three-dimensional structure according to claim 1, wherein the solidifying the powder is performed by radiating a laser beam.

13. A manufacturing apparatus for a three-dimensional structure comprising:

a laser to heat a stage on which a first composition and/or a second composition is subsequently to be dispersed on such that the stage is heated in advance of the first composition and/or the second composition being deposited thereon;

a plurality of discharging sections configured to discharge respective first and second compositions including different kinds of powder;

a driving section configured to move the plurality of discharging sections in three-dimensional directions relatively to a discharge region to discharge respective first and second compositions in unit layers, subsequent to the stage being heated by the laser, in a stacking direction and in a plane direction crossing a thickness direction of the unit layers, the first composition being discharged from a first discharging section and the second composition being discharged from a second discharging section, a first powder included in the first composition and a second powder included in the second composition are mixed powders including a plurality of powders, wherein the mixed powders include a third powder, and the first powder and the second powder include the third powder;

a plurality of solidifying sections each configured to solidify respective powder in the respective first and second compositions, each solidifying section configured to direct a first energy beam toward the first powder and a second energy beam toward the second powder, the first energy beam being directed along an optical path disposed within a supply passage of the first discharging section, the first composition encircling the optical path; and
a control section configured to control the discharging sections, the driving section, and the solidifying sections, wherein
the control section controls the plurality of discharging sections and the driving sections to change presence ratios of the first and second compositions for each piece of the three-dimensional structure so that the unit layers in the stacking direction and between a first side and a second side of the unit layers in the plane direction have an inclined composition of the first powder and the second powder of the different kinds of powder in which a presence ratio of the second composition with the second powder increases in the stack direction and from the first side toward the second side,
wherein a first laser provides the first energy beam, and a second laser provides the second energy beam, the first laser and the second laser are positioned between, relative to a direction of the optical path disposed within the supply passage of the first discharging section, the first discharging section and the second discharging section,
wherein the first laser emits the first energy beam in a first direction that intersects the direction of the optical path, and the second laser also emits the second energy beam in a second perpendicular direction that intersects the direction of the optical path, and
wherein a first mirror redirects the first energy beam from the first direction to the direction of the optical path, and a second mirror redirects the second energy beam from the second direction to the direction of the optical path.

14. A manufacturing apparatus of claim 13, wherein the unit layers are formed by depositing the first and second compositions from a rotating member.

15. A control program for a manufacturing apparatus for a three-dimensional structure, the control program causing the manufacturing apparatus to perform the following:
causing a laser to heat a stage on which a first composition and/or a second composition is subsequently to be dispersed on such that the stage is heated in advance of the first composition and/or the second composition being deposited thereon;
subsequent to the stage being heated by the laser, forming unit layers on the stage using the first composition, which includes first powder, and the second composition, which includes second powder, the first composition being discharged from a first supply nozzle and the second composition being discharged from a second supply nozzle, the first powder included in the first composition and the second powder included in the second composition are mixed powders including a plurality of powders, wherein the mixed powders include a third powder, and the first powder and the second powder include the third powder; and
solidifying the first powder and the second powder in the unit layers by directing at least one of a first energy beam toward the first powder and a second energy beam toward the second powder, the first energy beam being directed along an optical path disposed within a supply passage of the first supply nozzle, the first composition encircling the optical path,
wherein, in the forming the unit layers, both of the first composition and the second composition are caused to be present in a stacking direction and in a plane direction crossing a thickness direction of the unit layers,
wherein, the unit layers in the stacking direction and between a first side and a second side of the unit layers in the plane direction have an inclined composition of the first powder and the second powder in which a presence ratio of the second composition increases in the stack direction and from the first side toward the second side,
wherein a first laser provides the first energy beam, and a second laser provides the second energy beam, the first laser and the second laser are positioned between, relative to a direction of the optical path disposed within the supply passage of the first supply nozzle, the first supply nozzle and the second supply nozzle,
wherein the first laser emits the first energy beam in a first direction that intersects the direction of the optical path, and the second laser also emits the second energy beam in a second perpendicular direction that intersects the direction of the optical path, and
wherein a first mirror redirects the first energy beam from the first direction to the direction of the optical path, and a second mirror redirects the second energy beam from the second direction to the direction of the optical path.

16. A control program of claim 15, wherein the unit layers are formed by depositing the at least one of the first and second compositions from a rotating member.

* * * * *